(12) United States Patent
Matsui et al.

(10) Patent No.: US 6,203,426 B1
(45) Date of Patent: Mar. 20, 2001

(54) CHARACTER MOVEMENT CONTROL IN A COMPETITION VIDEO GAME

(75) Inventors: Masanori Matsui, Kobe; Hideyuki Fujiwara, Neyagawa, both of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/193,090

(22) Filed: Nov. 16, 1998

(30) Foreign Application Priority Data

Nov. 19, 1997 (JP) .................................................... 9-318382

(51) Int. Cl.$^7$ ........................................................ A63F 9/24
(52) U.S. Cl. ............................................ 463/6; 463/6; 463/7
(58) Field of Search ........................ 463/1, 6, 7; 273/445

(56) References Cited

U.S. PATENT DOCUMENTS

| | | | |
|---|---|---|---|
| 5,713,794 | * | 2/1998 | Shimojima et al. .................... 463/36 |
| 5,872,575 | * | 2/1999 | Segal ..................................... 345/473 |

FOREIGN PATENT DOCUMENTS

| | | |
|---|---|---|
| 60-113594 | 7/1887 | (JP) . |
| 8-280936 | 10/1996 | (JP) . |
| 9-24161 | 1/1997 | (JP) . |

OTHER PUBLICATIONS

"Nagano Winter Olympics '98." Nintendo Sports. Jan. 1998. [online] Retrieved off the internet. [Mar. 30, 2000].*

Monthly Game Walker, Kadokawa publishing Company, vol. 3(9–23), pp. 88–93 (Sep. 1, 1996).

Monthly Game Walker, Kadokawa publishing company, vol. 4(8–34), p. 116 (Aug. 1, 1997).

Monthly Game Walker, Kadokawa publishing Company, vol. 4(10–36), p. 122 (Oct. 1, 1997).

* cited by examiner

Primary Examiner—Michael O'Neill
Assistant Examiner—Julie Kasick
(74) Attorney, Agent, or Firm—Jordan and Hamburg LLP

(57) ABSTRACT

In a competition video game machine, the speed for moving a character is variable according to the operation timing. A controller's operation determining function determines the on/off operation of a left trigger button and a right trigger button. An operation control function controls the skater's operation according to the activation of the left trigger button or the right trigger button. The skater's operation is controlled to repeat the cycle, consisting of an acceleration warm-up operation period, an acceleration operating period, and a decelerating operation period, for the left foot and the right foot alternately. Each operation period lasts for a predetermined period and, when one operation period is finished, the operation is shifted to another operation period. If, however, either the left trigger button or the right trigger button is activated while the above cycle is in progress, the current cycle for the corresponding foot is fast-forwarded to immediately start the acceleration warm-up operation period of the subsequent cycle for the other foot.

16 Claims, 17 Drawing Sheets

CHARACTER MOVEMENT CONTROL IN A COMPETITION VIDEO GAME

BACKGROUND OF THE INVENTION

1. Field of the Invention

The present invention relates to a competition video game machine using, for example, a cassette-type recording medium, such as an optical disc, a magnetic disk, or a semiconductor memory, on which program data is recorded. The invention is also concerned with a character movement control method for use in a competition video game, and to a recording medium on which a character movement control program is recorded.

2. Description of the Related Art

Hitherto, many kinds of game systems have been proposed. For example, one type of game system is formed of a home-use game machine and a television monitor. Another type of game system consists of a commercial-use game machine, a personal computer or a workstation, a display unit, and a sound output device.

Each of the above systems includes a controller operated by a game player, a recording medium on which game program data is recorded, a central processing unit (CPU) that controls the elements of the system to produce sound and images based on the game program data, a processor for creating images, a processor for producing sound, a cathode ray tube (CRT) for displaying images, and a speaker for outputting sound. As the above-described recording medium, a compact disc-read only memory (CD-ROM), a semiconductor memory, and a cassette that integrates a semiconductor memory are primarily used.

As one kind of the above game systems, the following speed-competition video game has become widely available. A character, such as a human figure model, displayed on a display unit is moved in a game space by a game player operating an operation unit to compete against the clock. In this type of competition video game, the preset speed for the character may desirably be varied in accordance with the player's level of skill, thereby making the game more enjoyable and entertaining.

SUMMARY OF THE INVENTION

Accordingly, in view of the above background, it is an object of the present invention to provide a competition video game in which the preset speed for a character is varied according to whether an operation unit is operated at a correct timing or an incorrect timing, and also to provide a character movement control method for use in a competition video game, and a recording medium on which a character movement control program is recorded.

In order to achieve the above object, according to one aspect of the present invention, there is provided a competition video game machine including display means for displaying a character which is moved in a game space to compete against a clock. Operation control means causes the character to sequentially perform a set of operations that consist of an acceleration warm-up operation performed in a first period, an accelerating operation performed in a second period, and a decelerating operation. Operation means provides an instruction to move the character. The operation control means causes the operation of the character to return to a start point of the first period when the operation means is operated.

According to another aspect of the present invention, there is provided a character movement control method for use in a competition video game in which a character displayed on display means is moved in a game space by operating operation means to compete against a clock. The character movement control method includes the steps of: causing the character to sequentially perform a set of operations that consists of an acceleration warm-up operation performed in a first period, an accelerating operation performed in a second period, and a decelerating operation; and causing the operation of the character to return to a start point of the first period when the operation means is operated.

According to a further aspect of the present invention, there is provided a recording medium for recording a character movement control program for use in a competition video game in which a character displayed on display means is moved in a game space by operating operation means to compete against a clock. The character movement control program includes an operation control step of causing the character to sequentially perform a set of operations that consists of an acceleration warm-up operation performed in a first period, an accelerating operation performed in a second period, and a decelerating operation; and a starting control step of causing the operation of the character to return to a start point of the first period when the operation means is operated.

With this arrangement, if the operation unit is operated to move the character, the character's operation is returned to the start point of the first period. Accordingly, if the operation unit is operated at a correct timing, the acceleration warm-up operation and the accelerating operation can be conducted without shifting to the decelerating operation. As a result, the speed for the character is variable according to whether the operation unit is operated at a correct timing or an incorrect timing, thereby making the competition video game more enjoyable and entertaining.

In the aforementioned competition video game machine, the operation control means may cause the character to perform the decelerating operation in a third period followed by the second period, and may also cause the character to repeat a cycle consisting of the first period, the second period, and the third period. With this arrangement, the character's movement is periodically repeated.

The aforementioned competition video game machine may further include storage means for storing frame images representing character's postures consisting of a predetermined number of frames that are preset in correspondence with the first period, the second period, and the third period. The operation control means may cause the display means to display the frame images in accordance with a lapse of each of the first, second, and third periods. Accordingly, the lapse of each period can be estimated by observing the displayed frame image.

In the aforementioned competition video game machine, the operation control means may cause the remaining frame images of the operation cycle to be fast-forwarded when the operation means is operated, and the operation control means may then return the operation to the first period. If the operation unit is operated to fast-forward the remaining periods of the cycle, the frame images are fed rapidly, and the character's posture changes quickly. This makes it possible to accurately express the idling state of the character's operation.

The aforementioned competition video game machine may further include display control means for displaying at least an end point of the second period on the display means. With this arrangement, if the operation unit is operated at a timing when the end point of the second period is indicated, the acceleration warm-up operation and the accelerating operation are performed without shifting to the decelerating operation. The game player is thus able to operate the operation unit at a suitable timing.

In the aforementioned competition video game machine, the character may include a first driving portion and a second driving portion for movement. The operation control means may cause the first driving portion and the second driving portion alternately to perform the above set of operations. The operation means may include a first operation unit which provides an instruction to move the first driving portion and a second operation unit which provides an instruction to move the second driving portion. With this arrangement, the first operation unit and the second operation unit can be operated in correspondence with the first driving portion and the second driving portion, respectively, thereby enhancing the competitive atmosphere of the game.

In the aforementioned competition video game machine, the game space may be a simulated skating rink, the character may be a simulated skater skating on the skating rink, and the first driving portion and the second driving portion may be the skater's feet. With this arrangement, an instruction may be provided to move one foot by the first operation unit, while an instruction may be provided to move the other foot by the second operation unit, thereby enhancing the competitive atmosphere of the game.

DESCRIPTION OF THE PREFERRED EMBODIMENT

Figure 1:
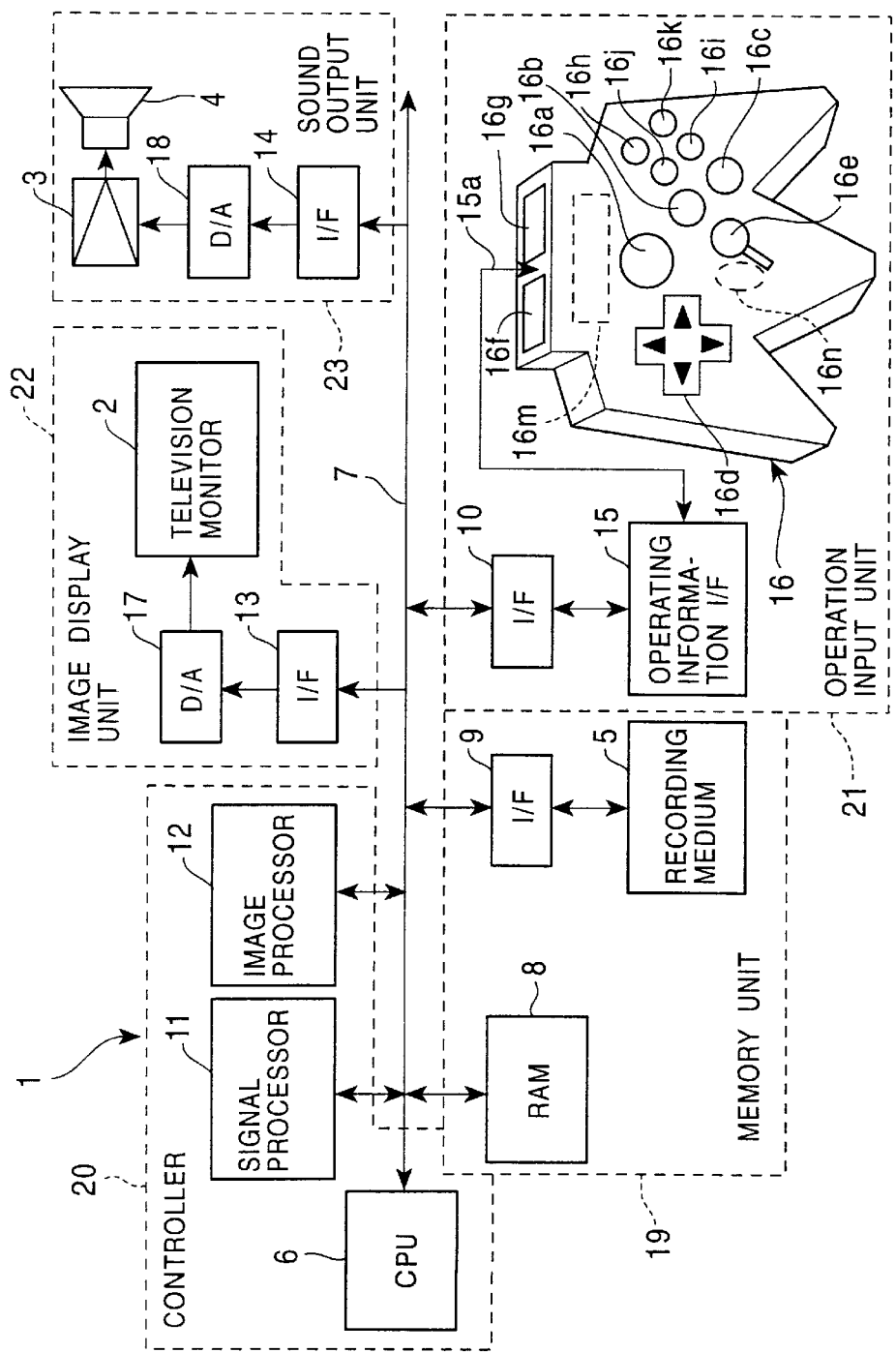
FIG. 1 is a block diagram illustrating a game system according to an embodiment of the present invention.

Referring to the block diagram illustrating an embodiment of the present invention shown in FIG. 1, a game system generally indicated by 1 is formed of a game machine unit, a television monitor 2 for outputting game images, an amplifying circuit 3 and a speaker 4 for outputting game sound, and a recording medium 5 on which game data including images, sound and program data is recorded. The recording medium 5 may be an optical disc, a flexible disk, or a ROM cassette in which a ROM storing, for example, the above game data and operating system program data, is accommodated within a plastic casing.

More specifically, the game machine unit is configured in the following manner. A bus 7 integrating an address bus, a data bus, and a control bus, is connected to a CPU 6. Connected to the bus 7 are a random access memory (RAM) 8, an interface circuit 9, an interface circuit 10, a signal processor 11, an image processor 12, an interface circuit 13, and an interface circuit 14. A controller 16 is connected to the interface circuit 10 via an operating information interface circuit 15. Digital-to-analog (D/A) converters 17 and 18 are connected to the interface circuits 13 and 14, respectively.

With the above arrangement, the RAM 8, the interface circuit 9, and the recording medium 5 form a memory unit 19. The CPU 6, the signal processor 11, and the image processor 12 form a controller 20 for controlling the progress of the game. The interface circuit 10, the operating information interface circuit 15, and the controller 16 form an operation input unit 21. The television monitor 2, the interface circuit 13, and the D/A converter 17 form an image display unit 22. The amplifying circuit 3, the speaker 4, the interface circuit 14, and the D/A converter 18 form a sound output unit 23.

The signal processor 11 primarily performs calculations for a three-dimensional space, calculations for transforming a three-dimensional space position into a pseudo-three-dimensional space position, calculations for the illuminant, and creating and processing sound data.

The image processor 12 writes image data into the RAM 8, for example, texture data to a specific area of the RAM 8 defined by a polygon, based on the calculations performed by the signal processor 11.

The controller 16 has a start button 16a, an A button 16b, a B button 16c, a cross key 16d, a stick-type controller 16e, a left trigger button 16f, a right trigger button 16g, a C1 button 16h, a C2 button 16i, a C3 button 16j, a C4 button 16k, a connector 16m, an inward button 16n.

A memory device for temporarily storing, for example, the current setting of a game, is attachable to and detachable from the connector 16m. The stick-type controller 16e is configured substantially in a manner similar to a joystick. More specifically, the stick-type controller 16e has an erect stick (operating rod), and tilts around a predetermined position of the stick in the area covering 360 degrees in the left and right directions and in the forward and backward directions. In accordance with the tilting direction and the tilting angle of the stick, the value on the X axis in the left and right directions and on the Y axis in the forward and backward directions around the erecting position of the stick, which serves as the origin, is output to the CPU 6 via the operating information interface circuit 15 and the interface circuit 10.

The configuration of the game system 1 varies according to the intended purpose of use. More specifically, if the game system 1 is for home use, the television monitor 2, the amplifying circuit 3, and the speaker 4 are provided separately from the game machine unit. On the other hand, if the game system 1 is for commercial use, all the elements shown in FIG. 1 are integrated into a single housing.

If the game system 1 is mainly formed by a personal computer or a workstation, the following elements are used in place of the above-described elements of the game system 1. A display unit for a computer or a workstation is substituted for the television monitor 2. Part of the game program data recorded on the recording medium 5 or hardware on an expansion board mounted on a computer expansion slot is used instead of the image processor 12. Hardware on an expansion board mounted on a computer expansion slot is substituted for the interface circuits 9, 10, 13, and 14, the D/A converters 17 and 18, and the operating information interface circuit 15. A particular area of a computer main memory or an expansion memory is used in place of the RAM 8.

In this embodiment, it is assumed that the game system 1 is for home use.

The schematic operation of the aforementioned game system 1 is described below.

A power switch (not shown) is turned on to activate the game system 1 to cause the CPU 6 to read images, sound, and the game program data from the recording medium 5 based on the operating system stored in the recording medium 5. The read images, sound, and game program data are entirely or partially stored in the RAM 8.

Thereafter, the CPU 6 proceeds with the game in accordance with the game program data stored in the RAM 8 and instructions provided by a game player via the controller 16. Namely, the CPU 6 suitably creates a command, which serves as a task for outputting a drawing or sound, based on the instructions provided by the game player via the controller 16.

The signal processor 11 performs calculations for character positions in a three-dimensional space (and in a two-dimensional space), calculations for the illuminant, and creating and processing sound data, based on the above-described command.

Subsequently, the image processor 12 writes image data into the RAM 8 based on the calculations performed by the signal processor 11. The image data is then supplied to the D/A converter 17 via the interface circuit 13 and is converted into an analog video signal. The video signal is further supplied to the television monitor 2 and is displayed on the screen as an image.

Meanwhile, the sound data output from the signal processor 11 is supplied to the D/A converter 18 via the interface circuit 14 and is converted into an analog sound signal. The sound signal is then output from the speaker 4 as sound via the amplifying circuit 3.

Figure 2:
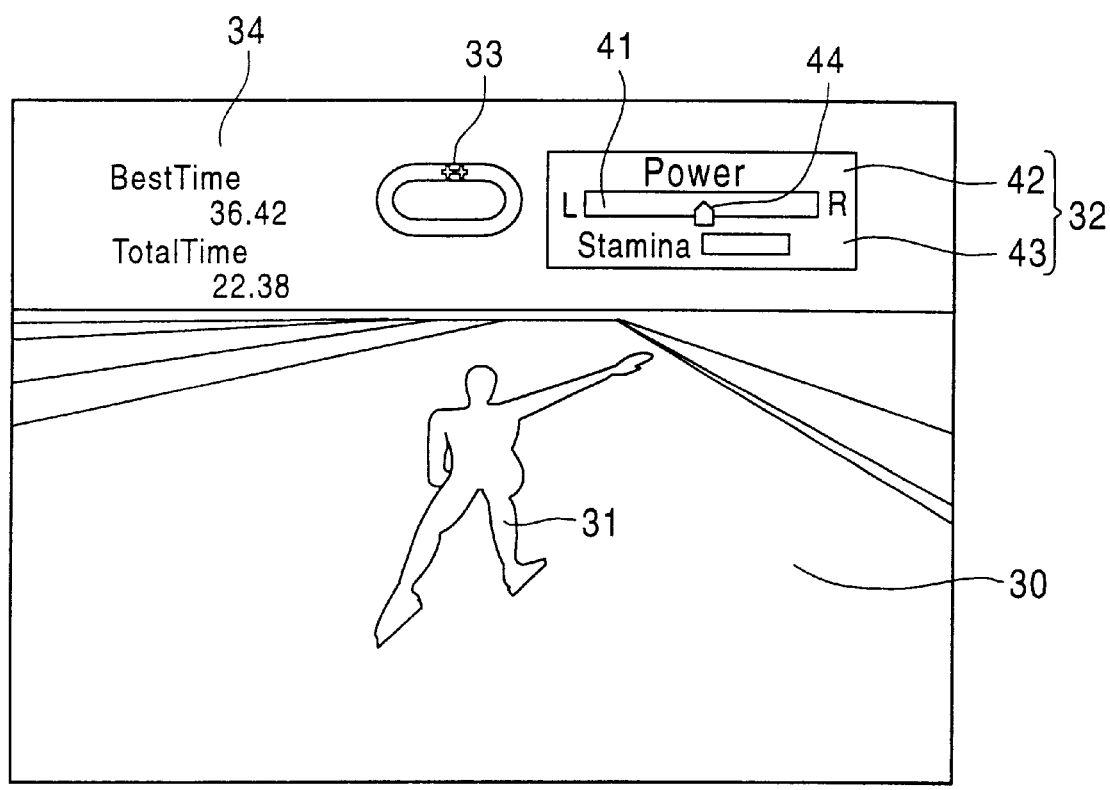
FIG. 2 illustrates an example of a game screen.

The game performed in the game system 1 of this embodiment is briefly explained below with reference to FIG. 2 illustrating one screen of the television monitor 2.

In the game system 1, in which the competition game is performed, speed-skating for competing against the time taken around one track of a skating rink may be performed. A course 30 is displayed at the center of the screen, as shown in FIG. 2, and a skater (character) 31 is also displayed on the course 30, the operation of the skater 31 being controlled by a game player. Shown on the upper part of the screen are a guide indicator 32 on the right side, a position indicator 33 at the center representing the position of the skater 31 on the skating rink, and a time indicator 34 on the left representing the best time and the total time.

The guide indicator 32 has a timing indicator 42 and a stamina indicator 43. The timing indicator 42 indicates the operation timing of the skater 31 according to the position of a mark 44 at a horizontally longitudinal gage 41. The stamina indicator 43 indicates the amount of stamina possessed by the skater 31 according to the length of a bar.

In this game system 1, a single game player may compete with the skater controlled by the CPU 6, or a plurality of game players may operate the controller 16 in turns, to compete for the total time with each other. Alternatively, two controllers 16 may be connected to form a two-handed game system, in which case, the screen may be divided into a left portion and a right portion to display the respective game screens.

Figure 3:
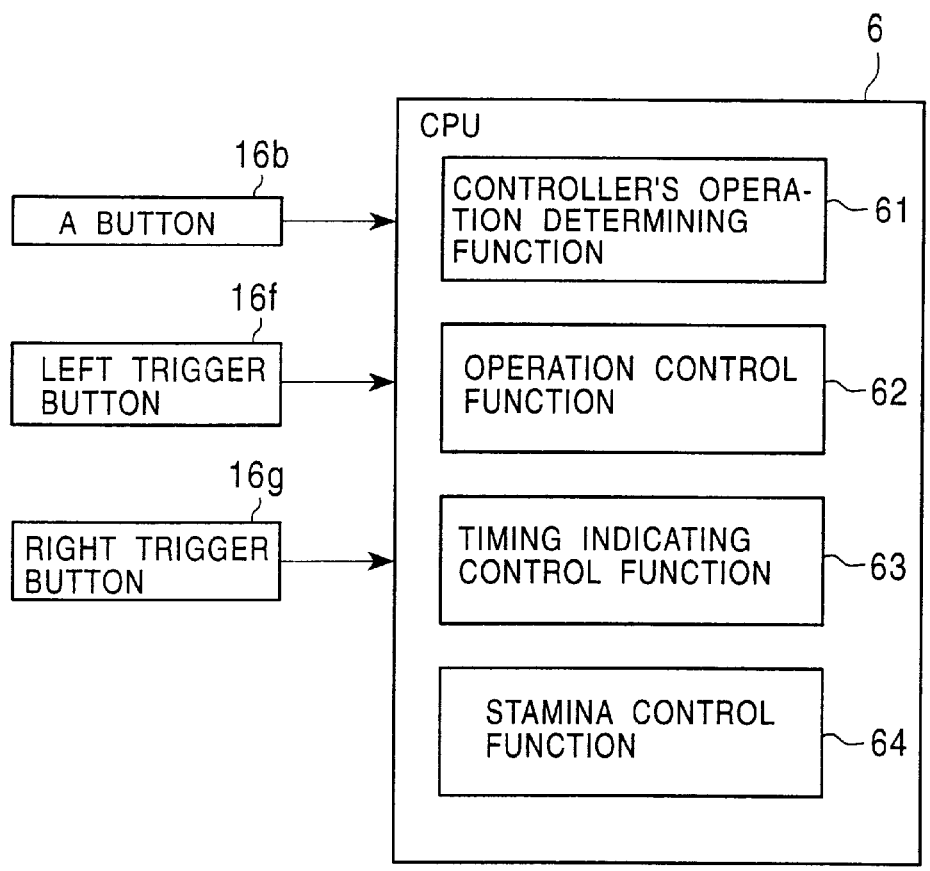
FIG. 3 is a block diagram illustrating functions of a CPU.
Figure 4:
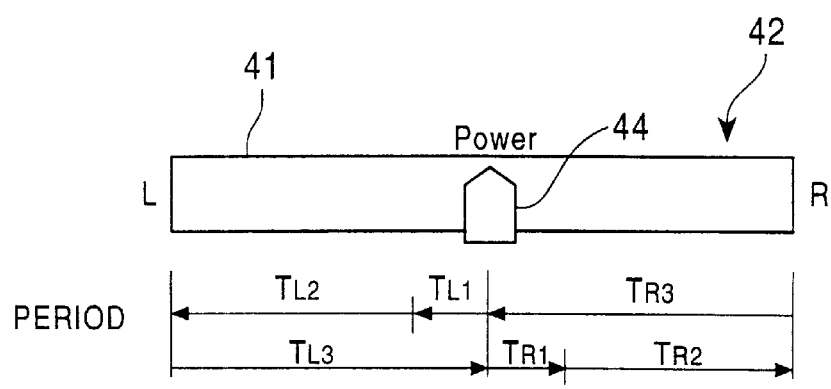
FIG. 4 illustrates the relationship between the skater's operation and the position of a mark of a timing indicator.

The functions of the CPU 6 are discussed in detail hereinbelow with reference to FIGS. 3 and 4. FIG. 3 is a block diagram illustrating the functions of the CPU 6. In FIG. 3, only the A button 16*b,* the left trigger button 16*f,* and the right trigger button 16*g* of the controller 16 are shown, and the other buttons and the interface circuits are omitted. FIG. 4 illustrates the relationship between the skater's operation and the position of the mark of the timing indicator 42.

The CPU 6 includes, as illustrated in FIG. 3, a controller's operation determining function 61, an operation control function 62, a timing indicating control function 63, and a stamina control function 64.

The controller's operation determining function 61 determines the one/off operations of the A button 16*b,* the left trigger button 16*f,* and the right trigger button 16*g*.

The operation control function 62 controls the skater's operation, and more specifically, (1) controls the skater's operation in response to the activation of the left trigger button 16*f* and the right trigger button 16*g,* and (2) while performing the control (1), selects the operating pattern, which is described in detail later, according to the number of activation times of the left trigger button 16*f* or the right trigger button 16*g*.

The skater's operation is controlled to repeat the cycle, which consists of an acceleration warm-up period, an accelerating operation period, and a decelerating operation period, for the left foot and the right foot alternately. The skater warms up during the acceleration warm-up period and accelerates during the accelerating operation period. During the decelerating operation period, the skater skates inertially after the accelerating operation and is controlled to decelerate at a constant rate in consideration of the frictional resistance of the ice surface.

Each operation period lasts for a predetermined time (for example, 0.5 seconds for the acceleration warm-up operation period, 1.5 seconds for the accelerating operation period, and 1.0 second for the decelerating operation period), and upon completing all the operation periods, one cycle is shifted to another cycle. If, however, either the left trigger button 16*f* or the right trigger button 16*g* is pressed while the current cycle is still progressing, so as to start a new cycle for the left or right foot of the character, the current cycle is fast-forwarded to completion, and the acceleration warm-up operation period for the subsequent cycle is immediately started.

For example, if the trigger button 16*f* or 16*g* is pressed during the acceleration warm-up operation period, the remaining time for the acceleration warm-up operation period, the accelerating operation period, and the decelerating operation period of the current cycle are fast-forwarded to completion, and the acceleration warm-up operating period for the subsequent cycle begins. Since the accelerating operation period of the previous cycle is shortened, the skater is inhibited from being sufficiently accelerated.

Conversely, if the game player presses the trigger button 16*f* or 16*g* when the accelerating operation period has been completed, the skater can be sufficiently accelerated, and the decelerating operation is shortened. As a consequence, the skater 31 is able to skate at the highest speed.

The timing indicating control function 63 causes the mark 44 indicated on the timing indicator 42, as illustrated in FIG. 4, to reciprocate between the left edge L and the right edge R of the gage 41, and controls the position of the mark 44 in correspondence with the operation period of the skater 31 controlled by the operation control function 62.

In FIG. 4, a predetermined period $T_{L1}$, after the mark 44 starts to shift from the center toward the left edge L, represents the acceleration warm-up operation period for the left foot. A period $T_{L2}$, in which the mark 44 is further shifted to the left edge L from the period $T_{L1}$, indicates the accelerating operation period for the left foot. A period TL3, in which the mark 44 returns to the center from the period $T_{L2}$, represents the decelerating operation period for the left foot.

Similarly, a predetermined period $T_{R1}$, after the mark 44 starts to shift from the center toward the right edge R, represents the acceleration warm-up operation period for the right foot. A period $T_{R2}$, in which the mark 44 is further shifted to the right edge R from the period $T_{R1}$, indicates the accelerating operation period for the right foot. A period $T_{R3}$, in which the mark 44 returns to the center from the period $T_{R2}$, represents the decelerating operation period for the right foot.

The stamina control function 64 decreases the stamina of the skater 31 and also gradually shortens the bar of the stamina indicator 43 during the acceleration warm-up operation period and the accelerating operation period. Conversely, during the decelerating operation period, the stamina control function 64 increases the stamina of the skater 31 and also gradually lengthens the bar. If the stamina of the skater 31 reaches zero, the skater advances only at a predetermined very low speed.

In this manner, the position of the mark 44 is controlled in correspondence with the operation period of the skater 31. Accordingly, if the trigger button 16f or 16g is activated when the mark 44 reaches the left edge L or the right edge R of the gage 41, the skater 31 is able to skate at the highest speed. By the position of the mark 44, the game player is able to read the correct timing of the activation of the trigger button 16f or 16g.

A description is now given below with reference to FIGS. 5 through 29 of the operation patterns of the skater 31 selected by the operation control function 62.

Figure 29:
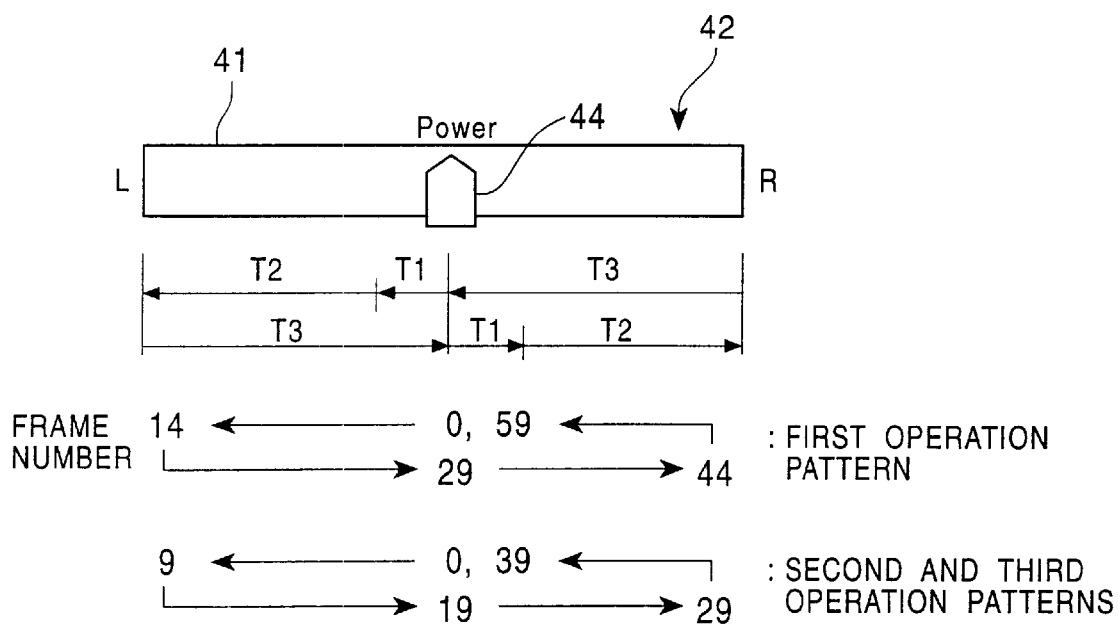
FIG. 29 illustrates the relationship between the position of the mark of the timing indicator and the frames of the operation patterns.

FIGS. 5 through 12 sequentially illustrate the game screen when the skater skates according to a first operation pattern. FIGS. 13 through 20 sequentially illustrate the game screen when the skater skates according to a second operation pattern. FIGS. 21 through 28 sequentially illustrate the game screen when the skater skates according to a third operation pattern. FIG. 29 illustrates the relationship between the position of the mark 44 of the timing indicator 42 and the frames of the operation patterns.

In this embodiment, three patterns such as the aforementioned first, second, and third operation patterns are set as the skater's operation patterns.

In the first operation pattern, as shown in FIGS. 5 through 12, the skater 31 skates while swinging the arms from side to side as far as possible. The first operation pattern is selected when the left trigger button 16f and the right trigger button 16g are activated a predetermined number of times or more.

In the second operation pattern, as illustrated in FIGS. 13 through 20, the skater 31 skates while crossing the arms behind the back. The second operation pattern is selected when the left trigger button 16f and the right trigger button 16g are pressed a predetermined number of times or fewer. In this operation pattern, the skater 31 skates at an intermediate speed.

In the third operation pattern, as shown in FIGS. 21 through 28, the skater 31 skates while standing substantially upright and crossing the arms behind the back. The third operation pattern is selected when neither the left trigger button 16f nor the right trigger button 16g is activated. In this operation pattern, the skater 31 skates at a speed lower than that of the second operation pattern.

If either the left trigger button 16f or the right trigger button 16g is activated while the third operation pattern is selected, the operation is shifted to the second operation pattern.

In the first operation pattern, one cycle including the acceleration warm-up operation period, the accelerating operation period, and the decelerating operation period consists of 60 frames ranging, for example, from frame number 0 to 59 (i.e., 60 postures of the skater 31). In the second and third operation patterns, one cycle consists of 40 frames ranging, for example, from frame number 0 to 39.

The frames of each operation pattern are set, as illustrated in FIG. 29, in correspondence with the positions of the mark 44 of the gage 41, i.e., one cycle consisting of the acceleration warm-up operation period T1, the accelerating operation period T2, and the decelerating operation period T3. The above-described relationship between each operation pattern and the positions of the mark 44 is stored as the game program in the recording medium 5 shown in FIG. 1.

Figure 30:
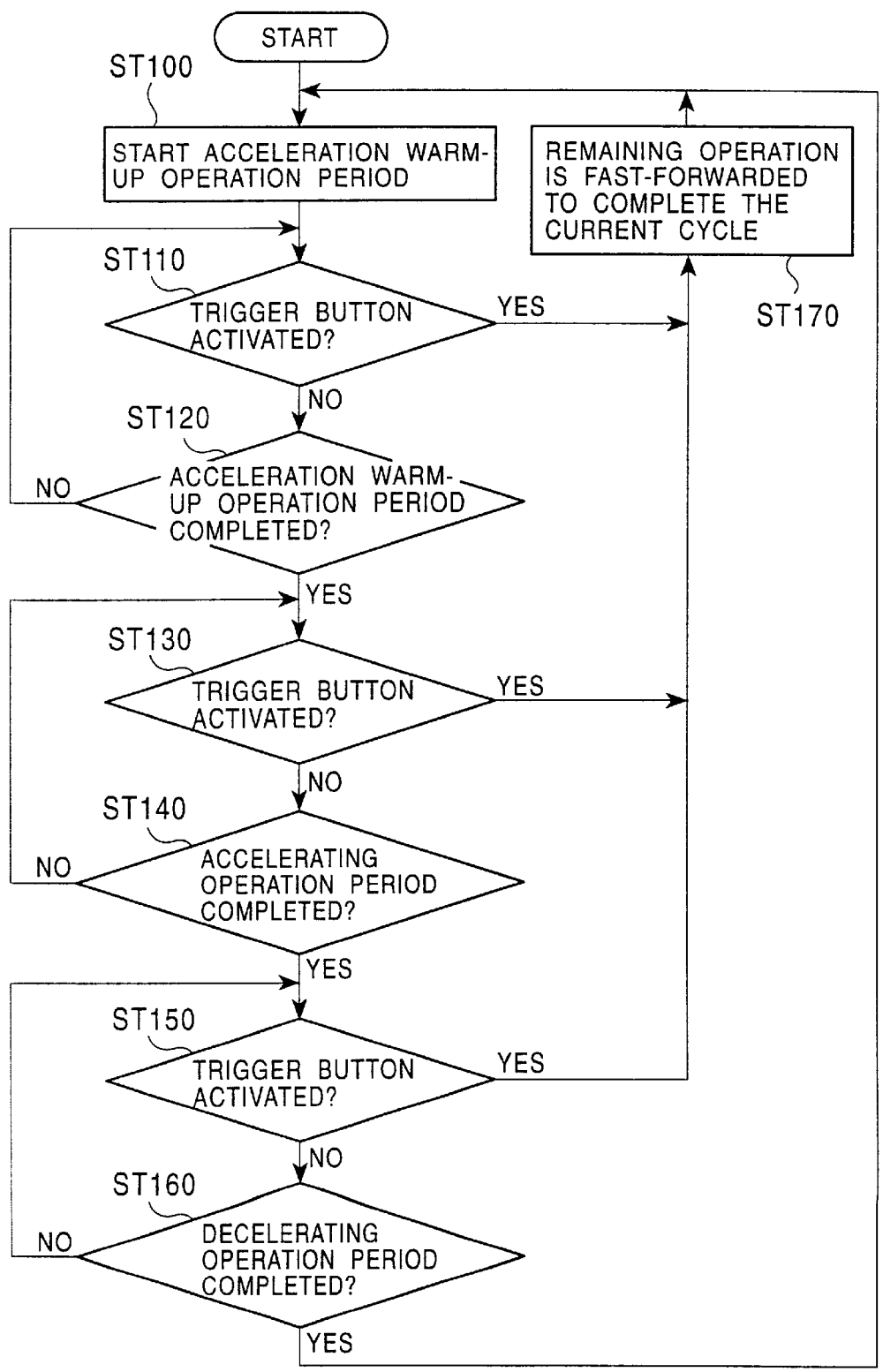
FIG. 30 is a flow chart illustrating a skater's operation control process.

The process of the operation performed by the skater 31 is now described hereinafter with reference to the flow chart of FIG. 30.

The acceleration warm-up operation period T1 for either foot is first started in step ST100. It is then determined in step ST110 whether either the left trigger button 16f or the right trigger button 16g has been activated. If it is found in step ST110 that the trigger button 16f or 16g for the foot opposite to the foot selected in step ST100 has been activated, the process proceeds to step ST170 in which the remaining time of the acceleration warm-up period T1, the accelerating operation period T2, and the decelerating operation period T3 are fast-forwarded to complete the current cycle. Subsequently, the process returns to step ST100 in which the acceleration warm-up operation period T1 for the foot selected in step ST110 begins.

In contrast, if it is found in step ST110 that neither the left trigger button 16f nor the right trigger button 16g has been activated, a determination is further made in step ST120 of whether the acceleration warm-up operating period T1 is completed. If the outcome of step ST120 is no, steps ST110 and ST120 are repeated until the acceleration warm-up operating period T1 is ended.

Upon completing the acceleration warm-up operation period T1 in step ST120, it is then checked in step ST130 whether either the trigger button 16f or 16g for the foot opposite to the foot selected in step ST100 has been pressed. If the result of step ST130 is yes, the process proceeds to step ST170 in which the remaining time of the accelerating operation period T2 and the decelerating operation period T3 are fast-forwarded to complete the current cycle. The process further returns to step ST100 in which the acceleration warm-up operation period T1 for the foot selected in step ST130 is started.

If it is found in step ST130 that neither the left trigger button 16f nor the right trigger button 16g has been activated, it is determined in step ST140 whether the accelerating operation period T2 has been completed. If the outcome of step ST140 is no, steps ST130 and ST140 are repeated until the accelerating operation period T2 is completed.

Upon completing the accelerating operation period T2 in step ST140, a determination is made in step ST150 of whether either the left trigger button 16f or the right trigger button 16g has been activated. If it is found in step S150 that the foot opposite to the foot in step S100 is activated, the process proceeds to step ST170 in which the remaining decelerating operation period T3 is fast-forwarded to complete the current cycle. The process further returns to step ST100 in which the acceleration warm-up operation period T1 for the foot selected in step ST150 commences.

If it is found in step ST150 that neither the left trigger button 16f nor the right trigger button 16g has been pressed, it is further checked in step ST160 whether the decelerating operation period T3 has been completed. If the result of step ST160 is no, steps ST150 and ST160 are repeated until the decelerating operation period T3 is terminated.

Upon completing the decelerating operation period T3 in step ST160, the process returns to step ST100 in which the acceleration warm-up operation period T1 of the foot opposite to the foot selected in the previous cycle is started.

The progress of the game in the first operation pattern is now described below with reference to FIGS. 5 through 12.

Figure 5:
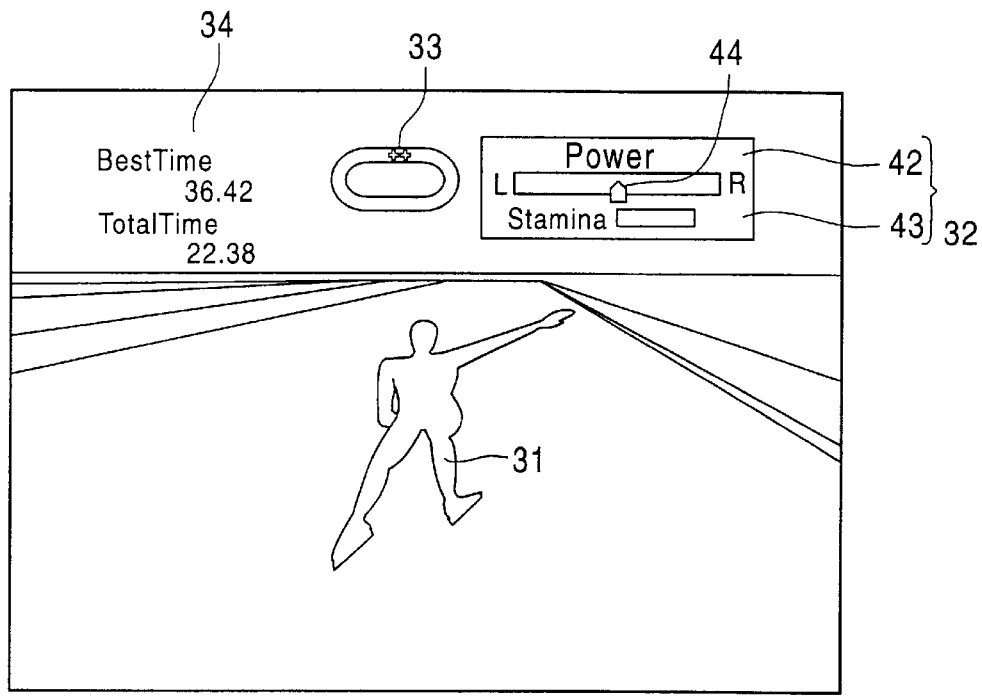
FIGS. 5 through 12 illustrate the procedure of the game when a skater is skating according to a first operation pattern.
Figure 6:
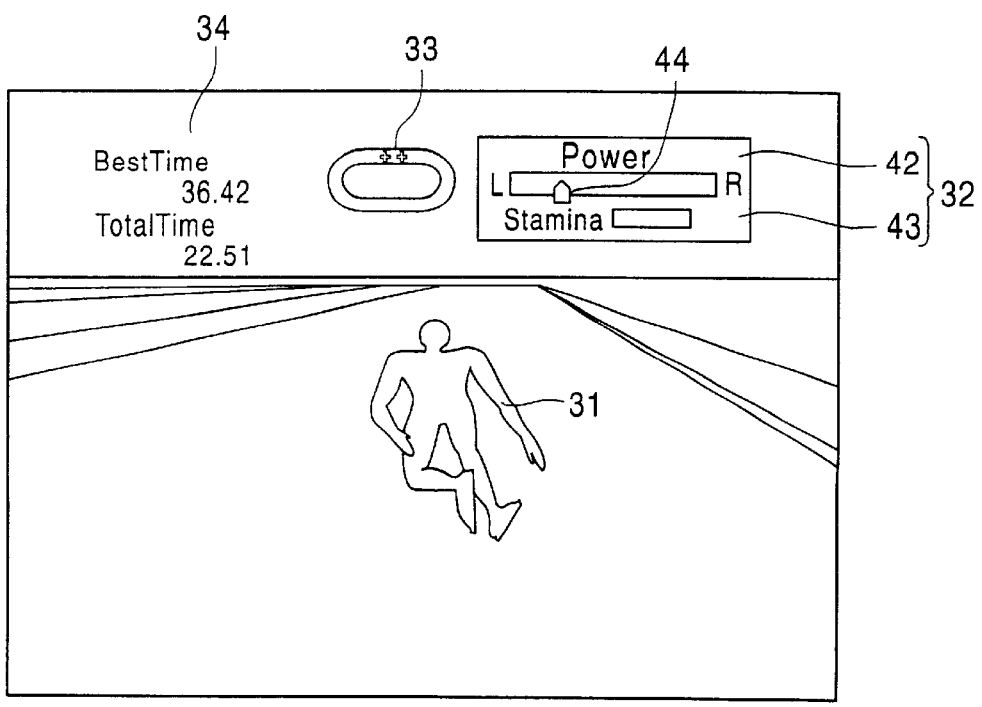

FIG. 5 illustrates the screen immediately after the left trigger button 16f has been activated. In FIG. 5, the acceleration warm-up operation period T1 for the left foot is started, and the mark 44 is positioned at the center of the timing indicator 42. FIG. 6 shows the screen in which the skater 31 is skating in the accelerating operation period T2 after the acceleration warm-up operation period T1 has been completed, and the mark 44 is shifting from the center toward the left edge L.

Figure 7:
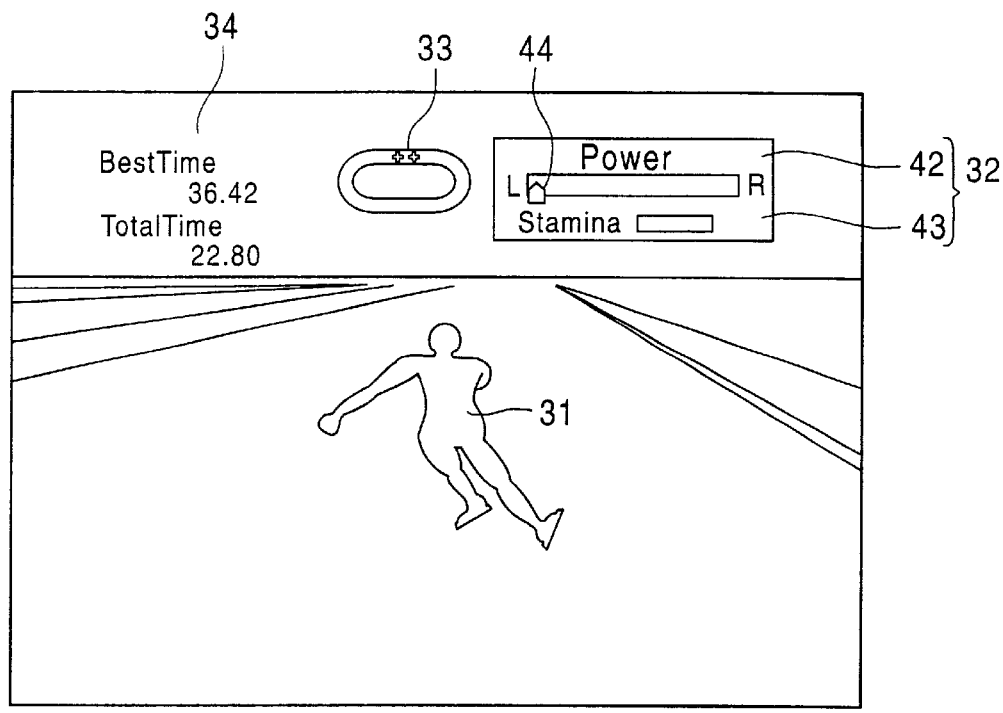
Figure 8:
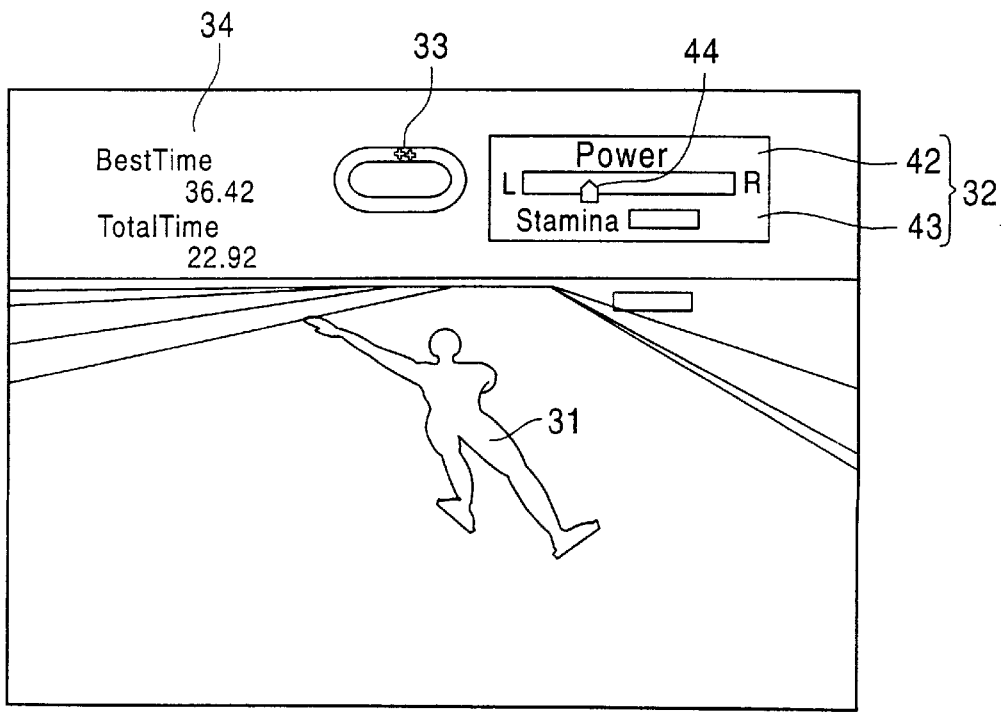

FIG. 7 illustrates the screen when the accelerating operation period T2 for the left foot is terminated, and the mark 44 is positioned at the left edge L. FIG. 8 shows the screen in which the skater 31 is skating in the decelerating operation period T3, and the mark 44 is shifting from the left edge L to the center.

Figure 9:
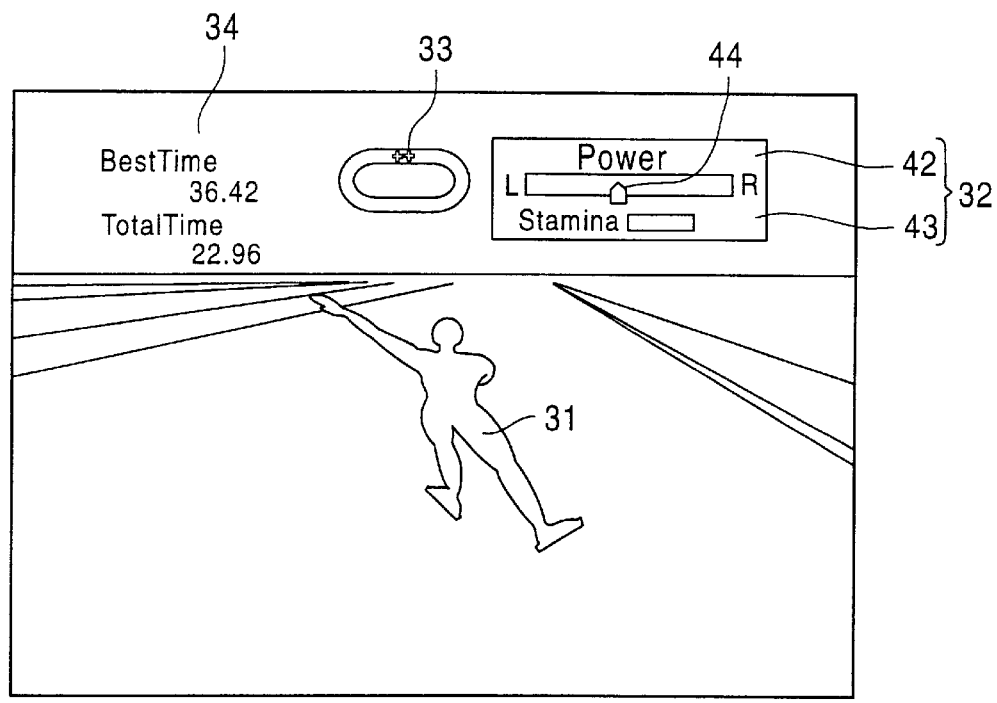
Figure 10:
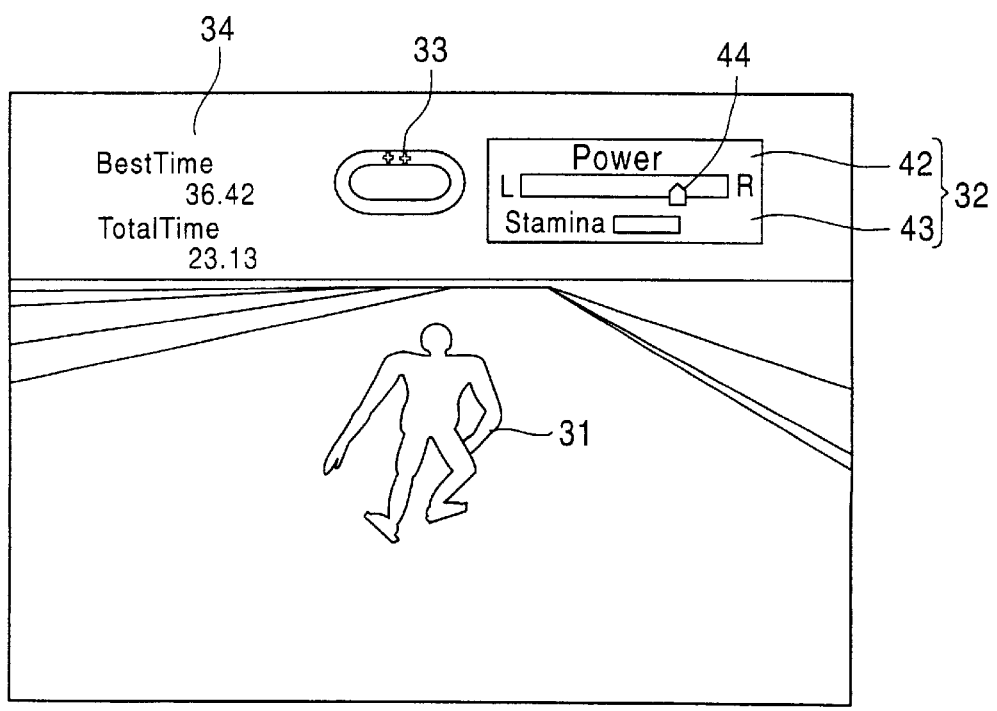

FIG. 9 illustrates the screen when the acceleration warm-up operation period T1 for the right foot is started after the decelerating operation period T3 for the left foot has been ended, and the mark 44 is positioned at the center of the timing indicator 42. FIG. 10 shows the screen in which the skater 31 is skating in the accelerating operation period T2 for the right foot after the acceleration warm-up operation period T1 for the right foot has been completed, and the mark 44 is shifting from the center toward the right edge R.

Figure 11:
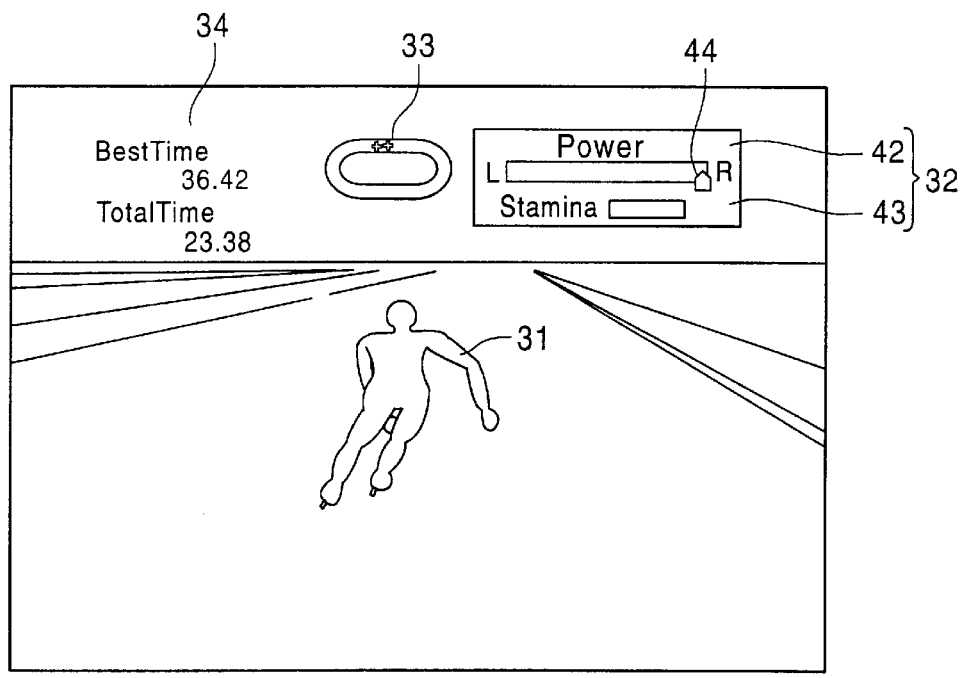
Figure 12:
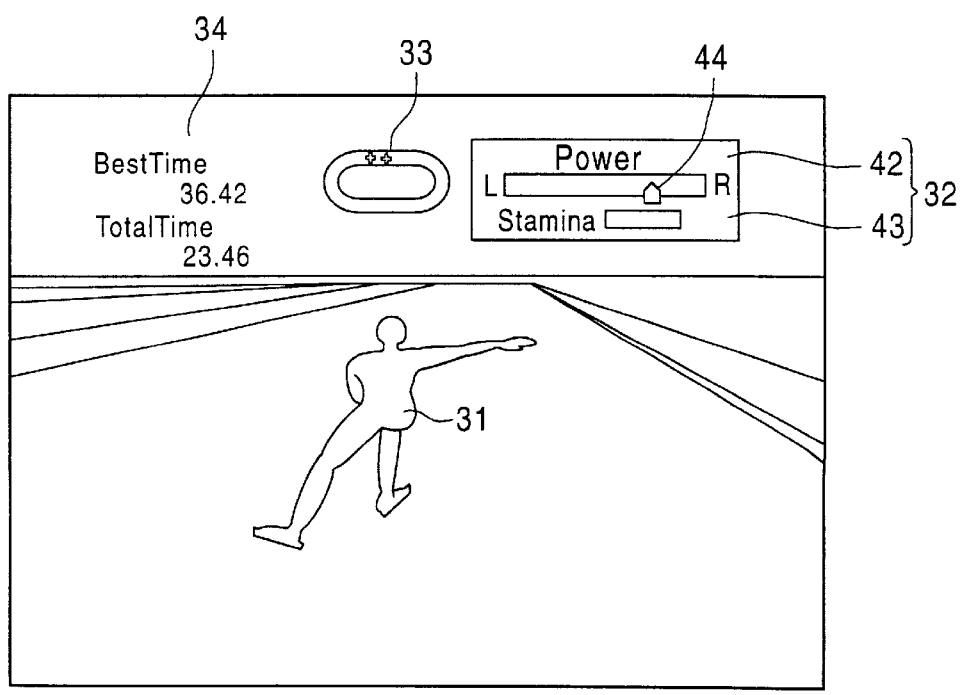
Figure 13:
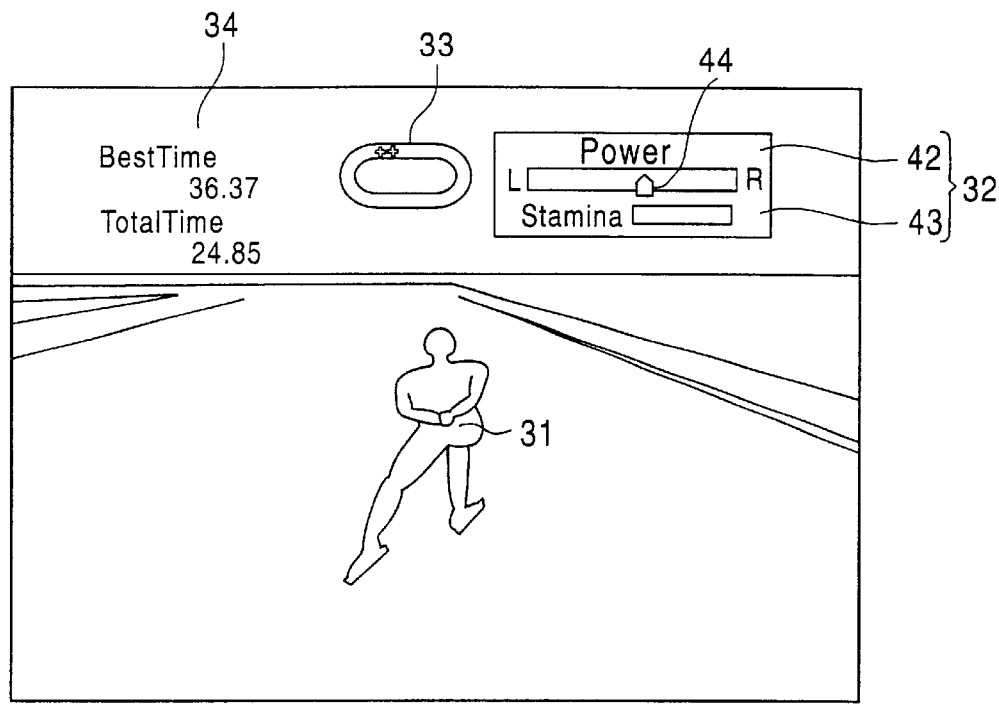
FIGS. 13 through 20 illustrate the procedure of the game when the skater is skating according to a second operation pattern.
Figure 14:
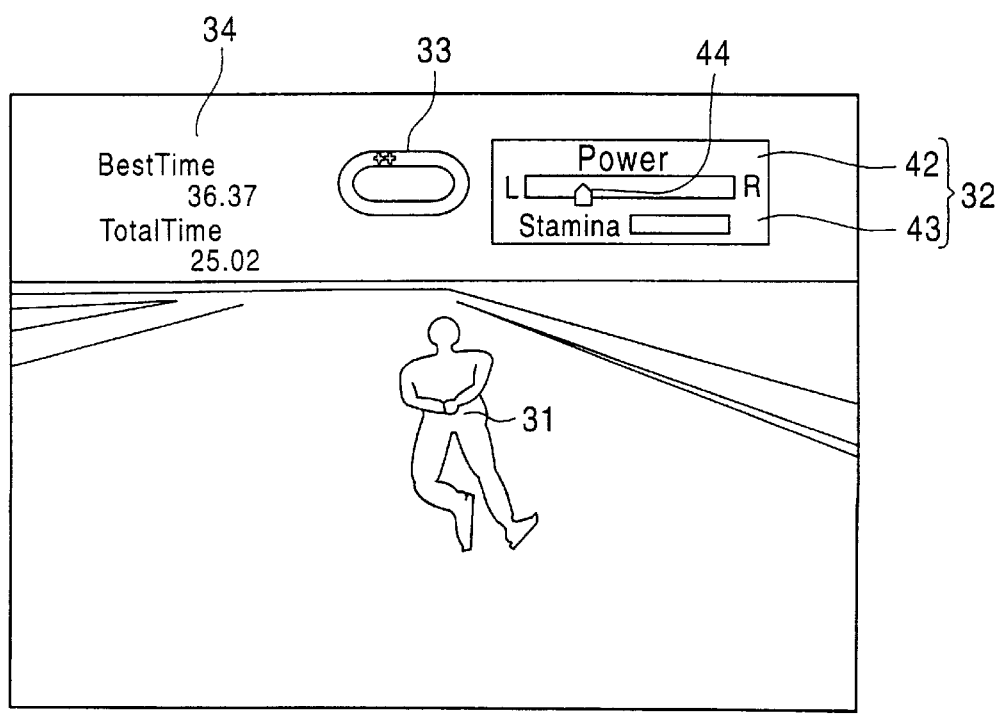
Figure 15:
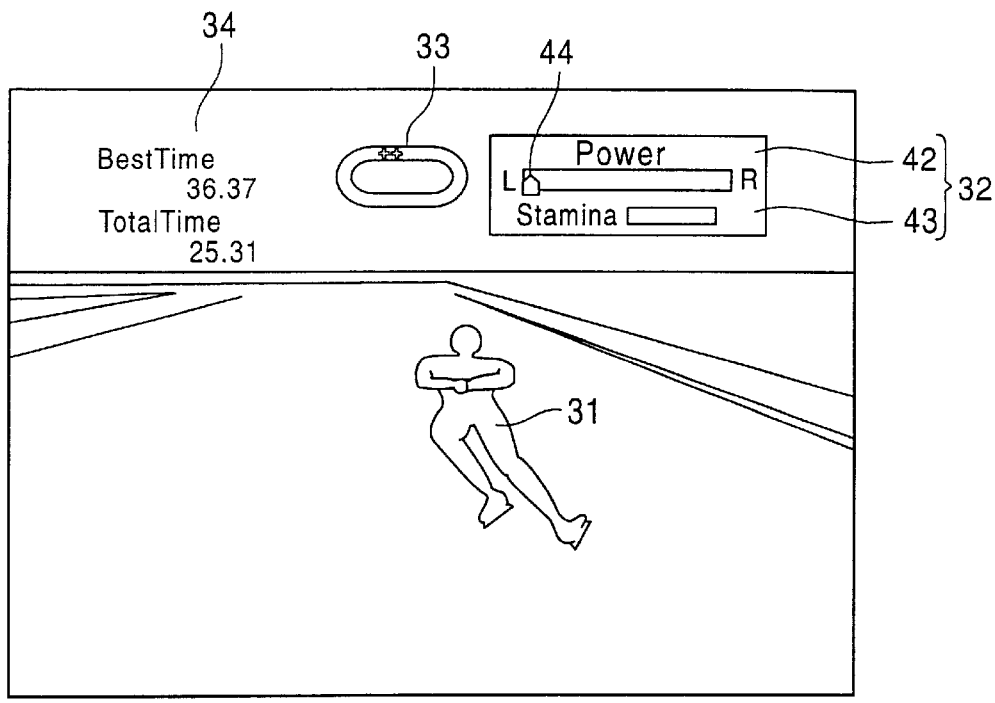
Figure 16:
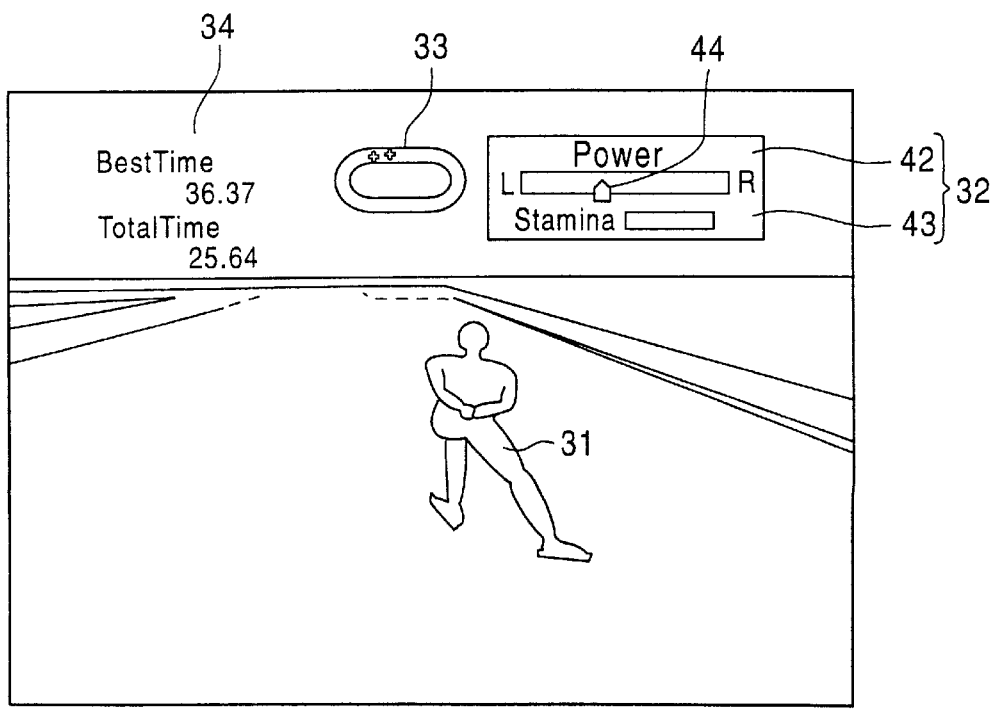
Figure 17:
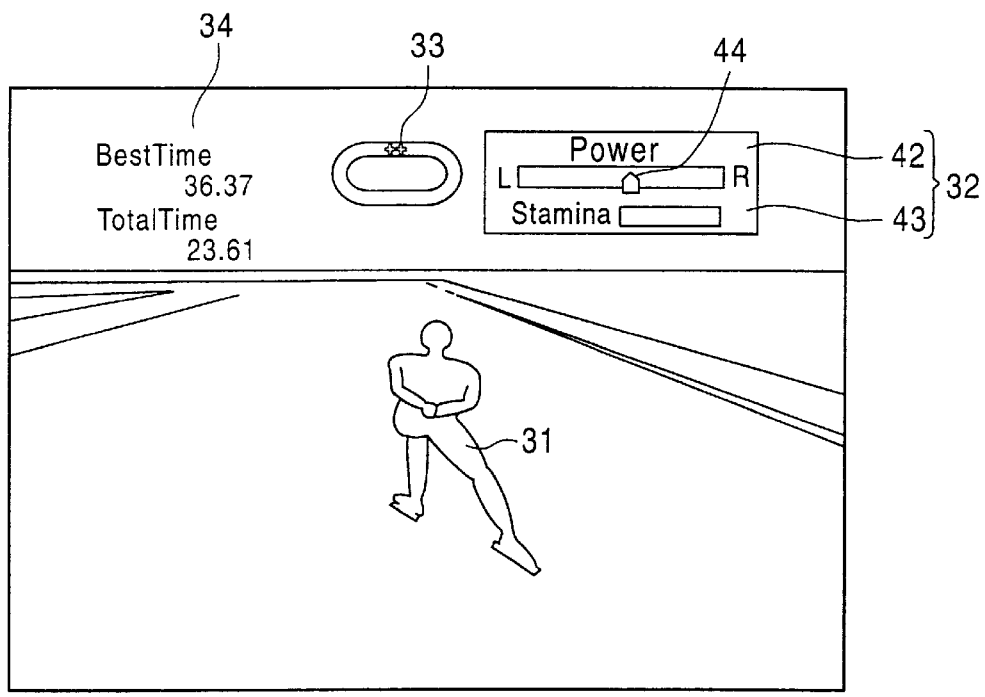
Figure 18:
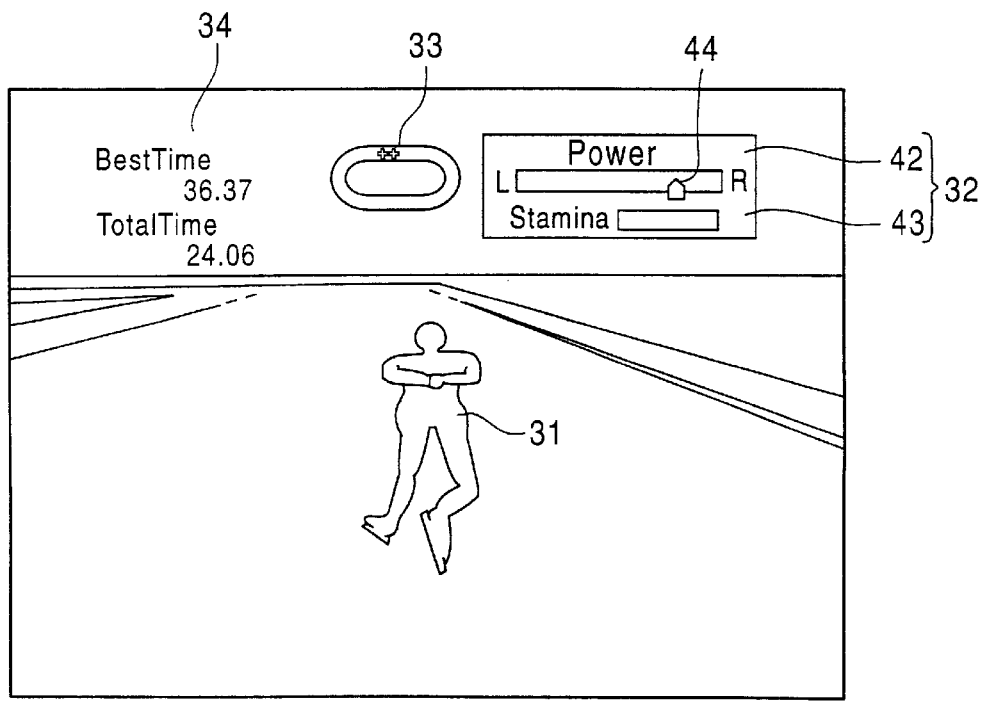
Figure 19:
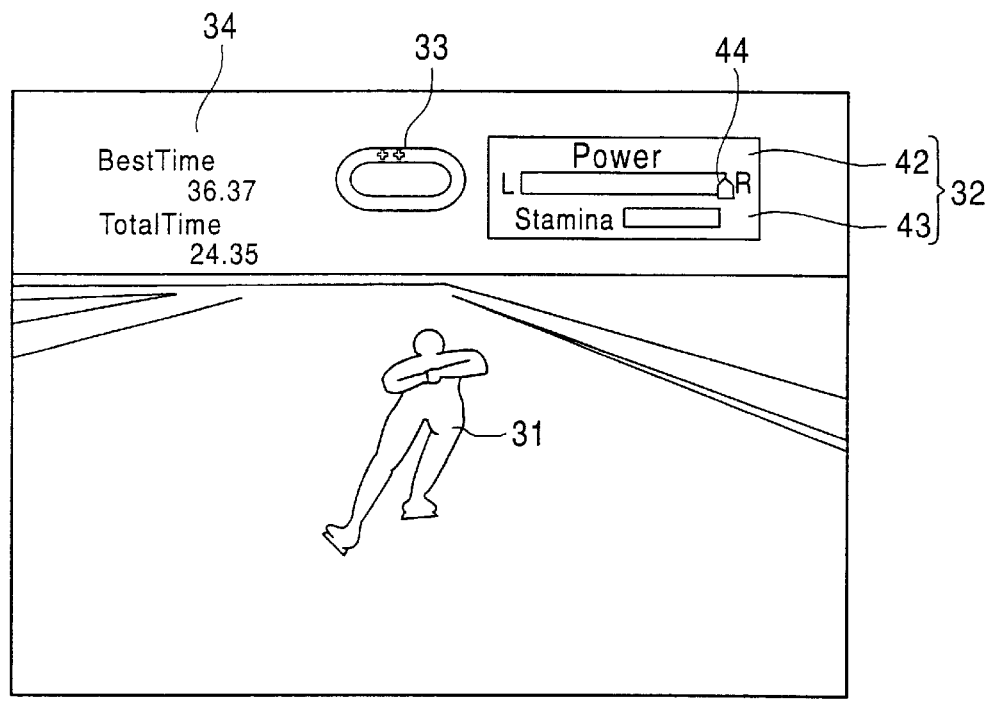
Figure 20:
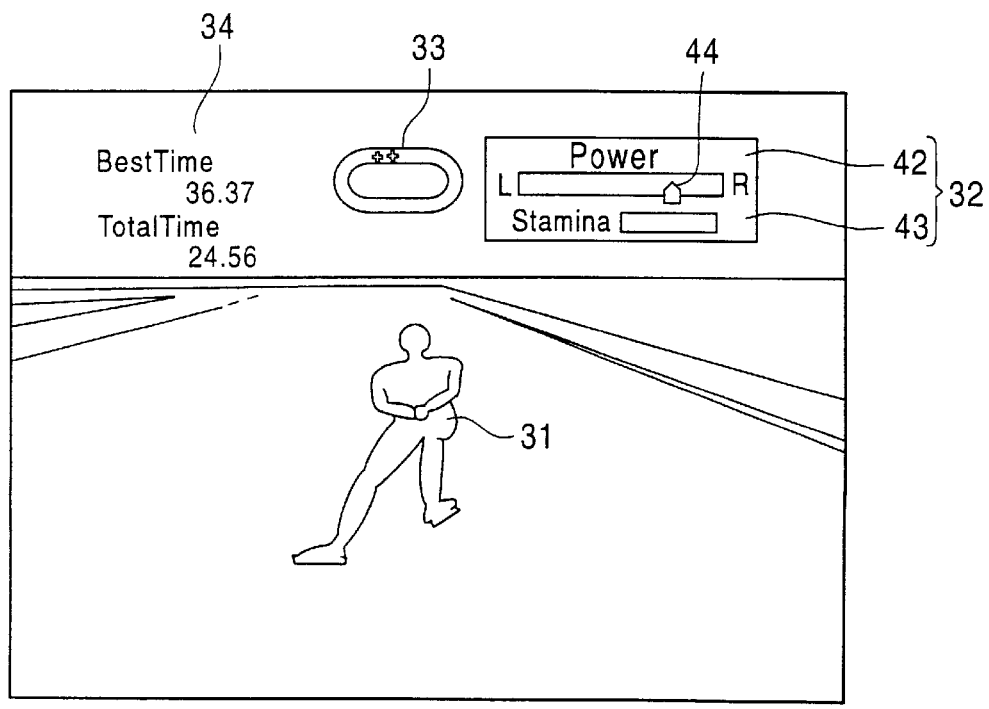
Figure 21:
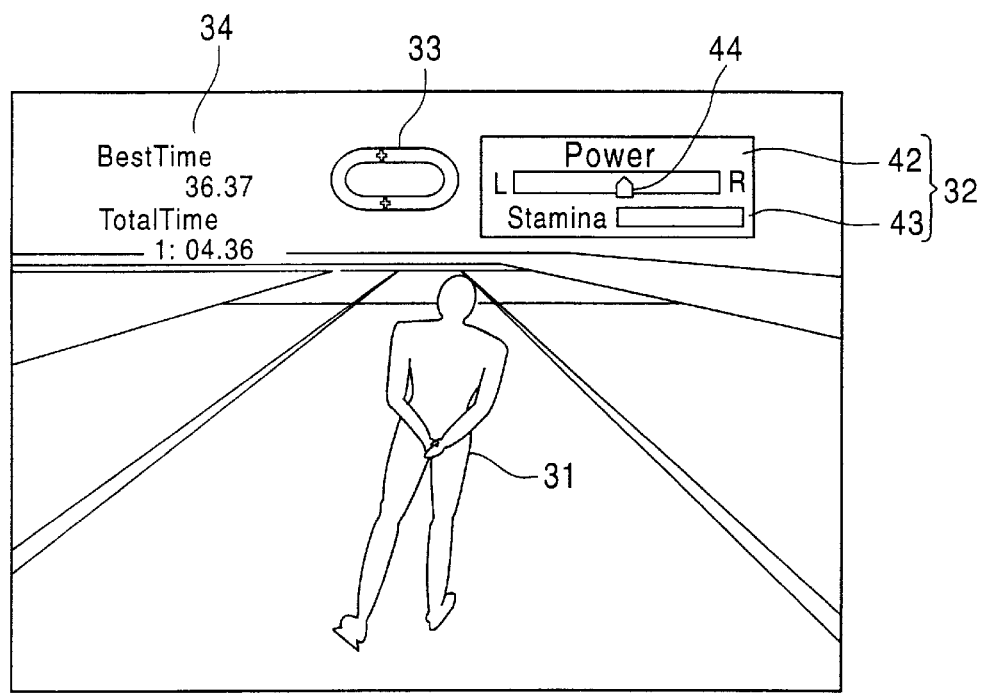
FIGS. 21 through 28 illustrate the procedure of the game when the skater is skating according to a third operation pattern.
Figure 22:
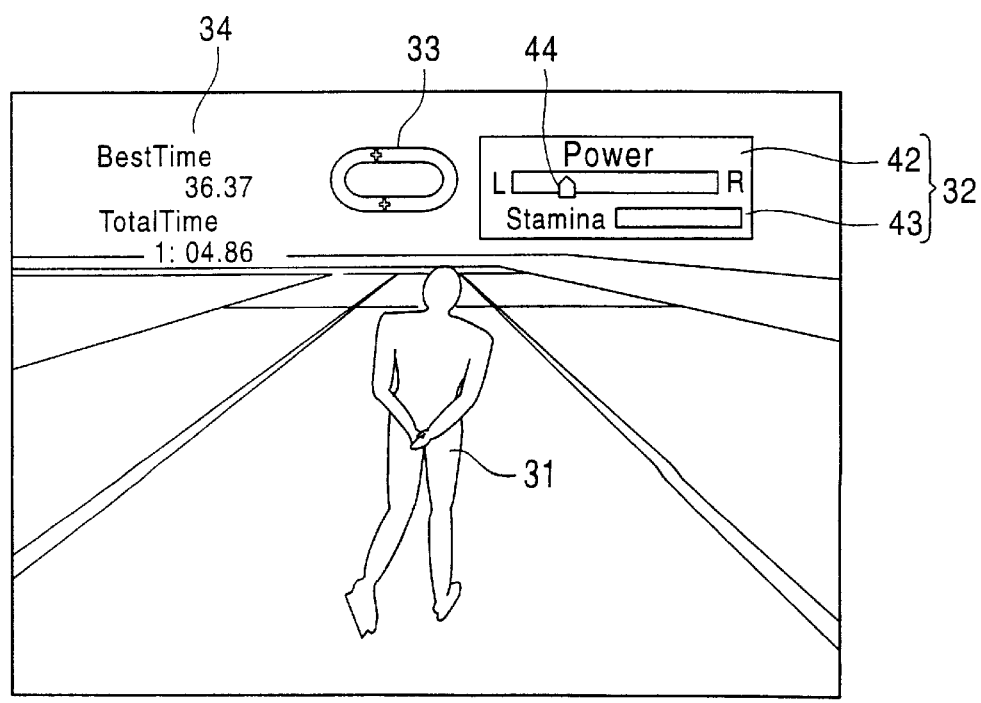
Figure 23:
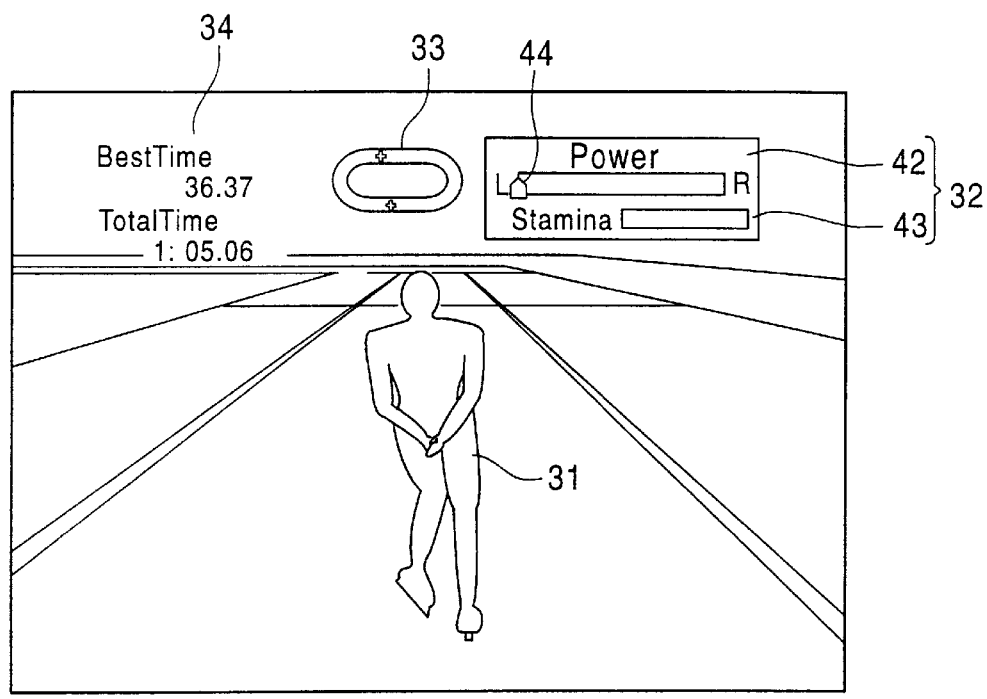
Figure 24:
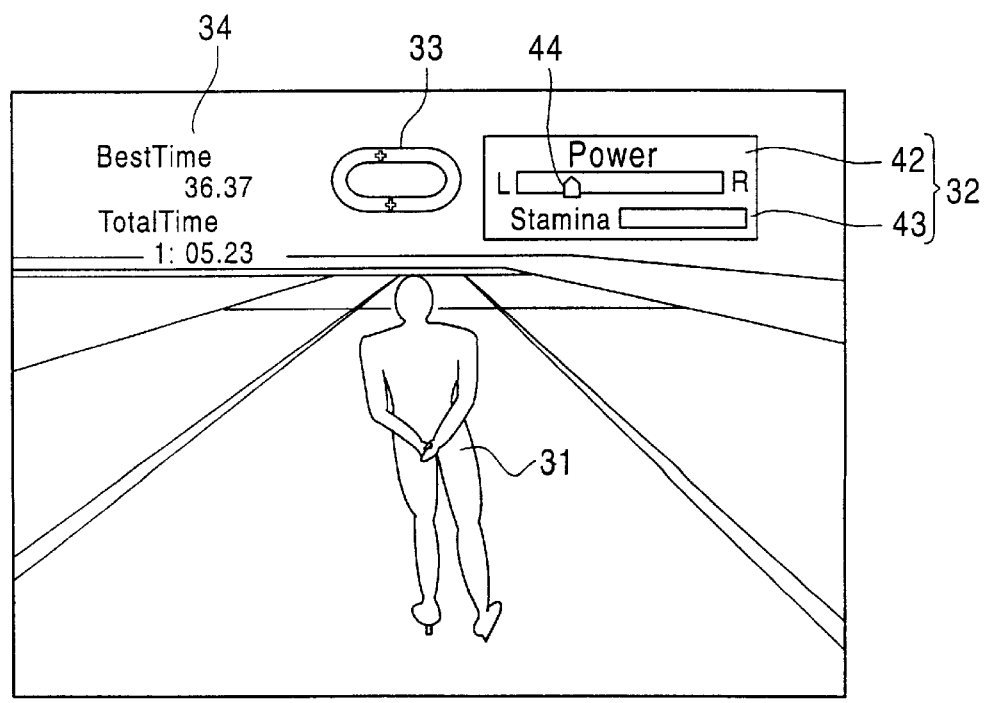
Figure 25:
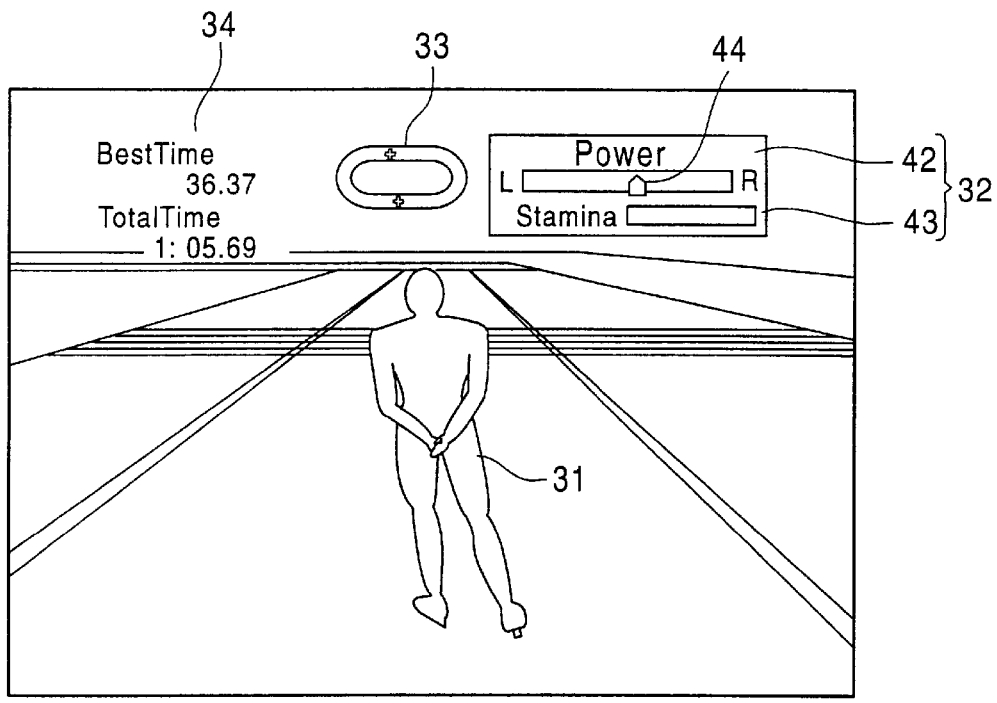
Figure 26:
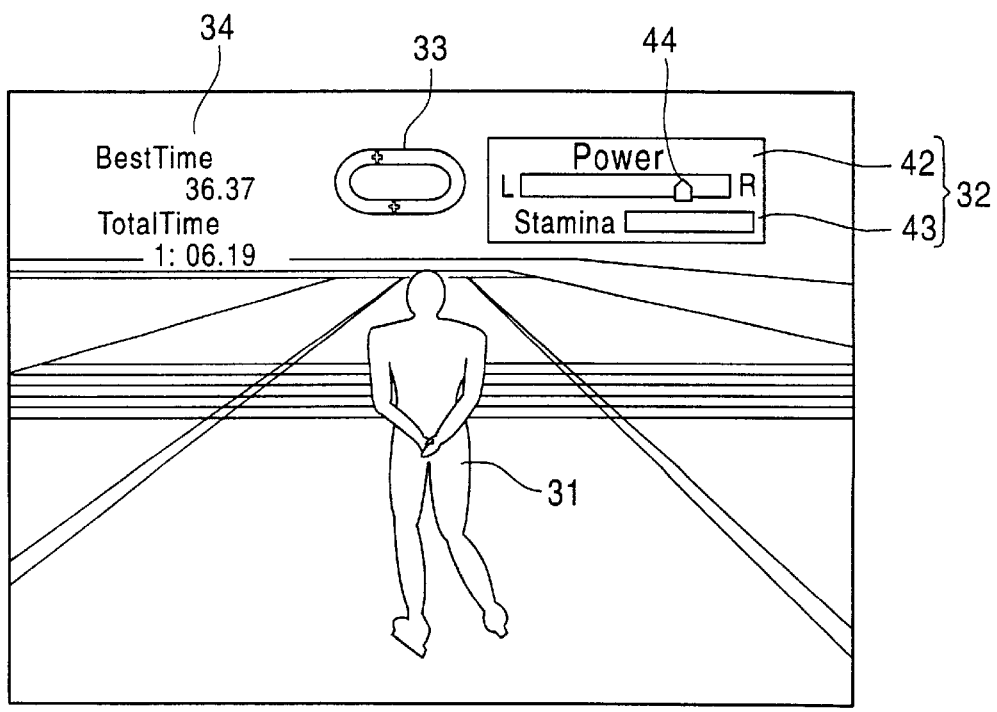
Figure 27:
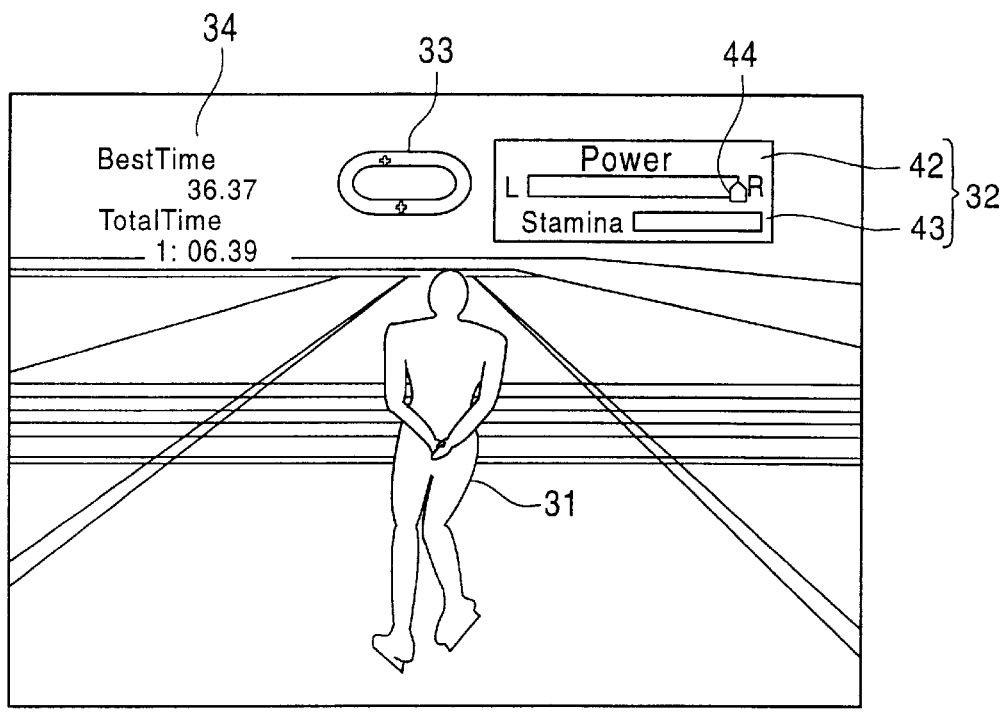
Figure 28:
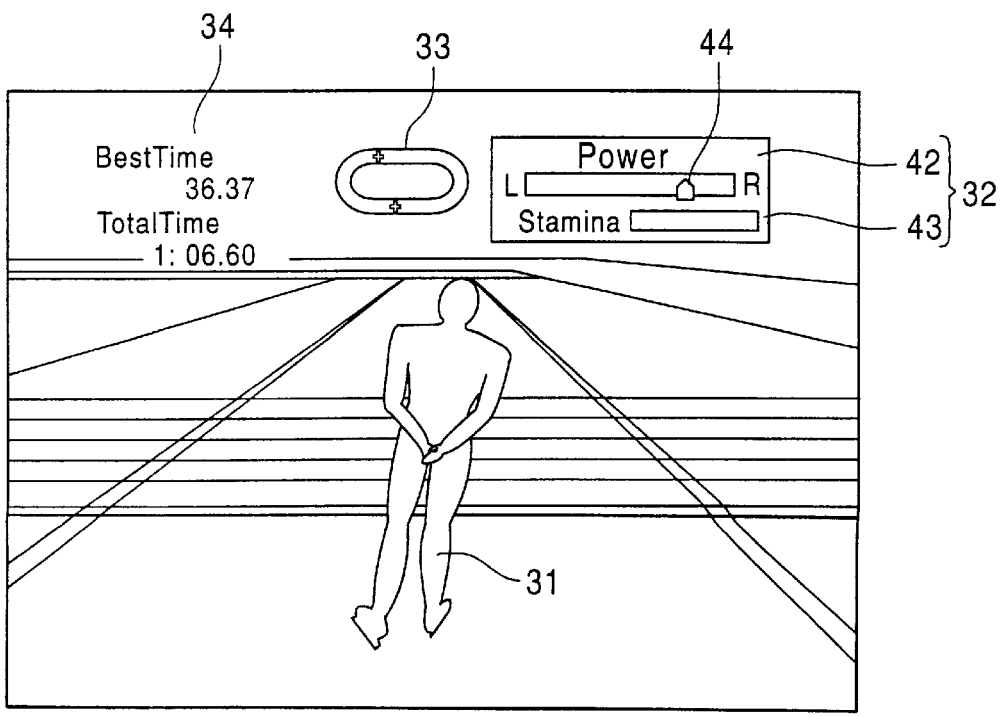

FIG. 11 illustrates the screen when the accelerating operation period T2 for the right foot has been completed, and the mark 44 is positioned at the right edge R. FIG. 12 shows the screen in which the skater 31 is skating in the decelerating operation period T3 for the right foot, and the mark 44 is shifting from the right edge R toward the center. The state of the screen then returns from that shown in FIG. 12 to that of FIG. 5.

In the aforementioned skater's operation, if the left trigger button 16f is activated when the accelerating operation period T2 for the left foot has been completed, as shown in FIG. 7, i.e., when the mark 44 is positioned at or around the left edge L, the acceleration warm-up operation period T1 for the subsequent cycle is immediately started after the accelerating operation period T1 of the current cycle has been completed. The same applies to the case in which the right trigger button 16g is activated when the acceleration operating period T2 for the right foot is terminated, as illustrated in FIG. 11, i.e., when the mark 44 is positioned at or around the right edge R.

In this case, the cycle of the operation periods of the skater 31, i.e., one reciprocating period of the mark 44, becomes comparatively long, for example, approximately four seconds. Accordingly, the frames of the skater's postures are fed, in other words, the skater's posture changes, rather slowly, in accordance with the longer reciprocating period of the mark 44. However, since the accelerating operation has been sufficiently performed, the skater 31 is able to skate at a high speed.

In contrast, if the right trigger button 16g is activated before the accelerating operation period T2 for the left foot is completed, as illustrated in FIG. 7, for example, while the skater 31 is skating in the accelerating operation period T2, as shown in FIG. 6, the acceleration warm-up operation period T1 for the right foot immediately commences. That is, the frames of the skater's postures are fast-forwarded, i.e., the states shown in FIGS. 7 and 8 are bypassed at a high speed, to reach the state shown in FIG. 9.

Likewise, if the left trigger button 16f is activated before the accelerating operation period T2 for the right foot is completed, as illustrated in FIG. 11, for example, in the state shown in FIGS. 8, 9, or 10, the acceleration warm-up operation period T1 for the left foot immediately begins. Namely, the frames of the skater's postures are fast-forwarded, i.e., the states illustrated in FIGS. 11 and 12 are bypassed at a high speed, to reach the state shown in FIG. 5.

As discussed above, if the left trigger button 16f or the right trigger button 16g is pressed at a timing in which the mark 44 is positioned away from the left edge L or the right edge R, the accelerating operation T2 for the foot in the current cycle is not sufficiently performed and is fast-forwarded, thereby forcing completion of the current cycle and starting the acceleration warm-up operation period T1 for the foot corresponding to the pressed button 16f or 16g for the subsequent cycle.

Therefore, the cycle of the skater's operation periods, i.e., one reciprocating cycle of the mark 44, becomes relatively short, for example, approximately one second. Namely, the frames of the skater's postures are fed in, i.e., the skater's posture shifts, rather quickly in accordance with the shorter reciprocating period of the mark 44. However, since the accelerating operation has not been sufficiently performed, the skater 31 skates at a low speed.

The frame feeding of the skater's postures may be performed in the following manner. The CPU 6 sends to the signal processor 11 an instruction signal indicating that some frames will be fast-forwarded. In response to this signal, the signal processor 11 reduces images in a frame unit, which will be transferred to a display memory, and increases the image transfer rate to the display memory.

The operation periods shown in FIGS. 13 through 20 according to the second operation pattern substantially correspond to those illustrated in FIGS. 5 through 12, respectively. The positions of the mark 44 shown in FIGS. 13 through 20 are also similar to those illustrated in FIGS. 5 through 12, respectively.

Similarly, the operation periods shown in FIGS. 21 through 28 according to the third operation pattern substantially correspond to those illustrated in FIGS. 5 through 12, respectively. The positions of the mark 44 shown in FIGS. 21 through 28 are also similar to those illustrated in FIGS. 5 through 12, respectively.

As noted above, if either the left trigger button 16f or the right trigger button 16g is activated while the third operation pattern is being selected, the operation is shifted to the second operation pattern. That is, if the trigger button 16f or 16g is pressed in one of the states shown in FIGS. 21 through 28, the operation is shifted to the corresponding state illustrated in one of FIGS. 13 through 20.

The present invention is not restricted to the aforementioned embodiment, and the following modifications (1) through (5) may be employed.

(1) The decelerating operation period T3 may not be provided. More specifically, when the skater 31 goes into the decelerating mode, the skater 31 may continue to skate in that mode unless the left trigger button 16f or the right trigger button 16g is pressed, thereby finally bringing the skater 31 to a stop. Even in the decelerating mode, the acceleration warm-up operation period T1 may be started by activating the trigger button 16f or 16g. In this modification, advantages similar to the advantages exhibited by the foregoing embodiment may be offered.

(2) The timing indicator 42 may be omitted. In this case, the images of the skater's postures consisting of a predetermined number of frames which are preset in correspondence with the acceleration warm-up operation period T1, the accelerating operation period T2, and the decelerating operation period T3 are displayed according to the lapse of the periods. Accordingly, the lapse of each operation period can be estimated by observing the image of the displayed frame, thereby making it possible to correctly operate the trigger buttons 16f and 16g.

(3) The mark 44 of the gage 41 is not necessarily used for the timing indicator 42, and any function may suffice as long as it indicates the lapse of the operation periods. Any function may be sufficient as long as it indicates at least the accelerating operation period, or at least the end of the accelerating operation period, in which case, a digital indicator, such as a dot indicator, may be used.

(4) Although in this embodiment a speed-skating game has been described, other games, such as a ski game, may also be used in the present invention. Additionally, as a model for the character, not only a human figure, but also an animal may be employed.

(5) In the foregoing embodiment, when the trigger button 16f or 16g is switched on while the current cycle is in progress, the remaining operation periods of the current cycle are fast-forwarded. However, the acceleration warm-up operation period may be immediately started without fast-forwarding the remaining operations.

As discussed above, according to the present invention, the character displayed on a display unit first enters the acceleration warm-up operation in the first period, and then shifts to the accelerating operation in the second period and finally to the decelerating operation. If the operation unit is operated to provide an instruction to the character while the above current operation cycle is in progress, the character's operation returns to the start point of the first period. With this arrangement, if the operation unit is operated at a correct timing, the acceleration warm-up operation or the accelerating operation can be performed without shifting to the decelerating operation.

Therefore, the speed preset for the character is variable according to whether an operation unit is operated at a correct timing or an incorrect timing, thereby making the competition video game more enjoyable and entertaining.

The character may perform the decelerating operation in the third period preceded by the second period. Then, the character may repeat a cycle consisting of the first, second, and third operation periods, in which case, the character starts the acceleration warm-up operation immediately after the decelerating operation has been completed.

The images representing the character's postures consisting of a predetermined number of frames which are preset in correspondence with the first, second, and third periods are stored in a storage unit. The images are then displayed on the display unit in accordance with the lapse of the periods, so that the lapse of the period can be estimated by observing the image displayed on the display unit. Accordingly, the operation unit can be operated at a time nearer the completion of the second period, thereby repeating the acceleration warm-up operation and the accelerating operation without shifting to the decelerating operation.

Alternatively, the operation unit may be operated to fast-forward the remaining frames of the first, second, and third periods of the current cycle, and the screen may be returned to the first period. In this case, since the remaining periods of the current cycle are shortened when the operation unit is operated while the current cycle is in progress, the image frames are forwarded rather fast, so that the character's postures change rapidly. Accordingly, if the operation unit is operated during the first period or the second period, the character's speed does not increase, though the character's postures change quickly. This makes it possible to accurately express the idling state of the character's operation.

It is not essential that the character's postures displayed on the display unit precisely correspond to the operation periods, and for representing the character's natural operation, some postures may correspond to the operation periods only approximately.

As noted above, all the operation periods are not necessarily indicated on the indicator. Instead, it may be sufficient for only the end of the second period to be indicated on the indicator. In this case, the operation unit can be operated at the end of the second period, thereby causing the character to perform the acceleration warm-up operation without shifting to the decelerating operation. Thus, the game player is able to operate the operation unit at a correct timing.

The character may include a first driving portion and a second driving portion for movement, and the operation unit may include a first operation unit and a second operation unit. With this arrangement, the above-described operations may be conducted on the first driving portion and the second driving portion alternately, and the first operation unit may provide an instruction to the first driving portion, while the second operation unit may provide an instruction to the second driving portion. In this case, the first operation unit and the second operation unit can be operated in correspondence with the first driving portion and the second driving portion, respectively, thereby improving the ease of operation and enhancing the competitive atmosphere of the game.

Additionally, as described above, the game space may be a simulated skating rink. The character may be a skater skating on the skating rink, and the first driving portion and the second driving portion may be the skater's feet. With this arrangement, an instruction may be provided to move one foot by the first operation unit, while an instruction may be provided to move the other foot by the second operation unit, thereby enhancing the competitive atmosphere of the game.

What is claimed is:

1. A competition video game machine comprising:
   display means for displaying a character which is moved in a game space to compete against a clock;
   operation means for providing an instruction to move said character; and
   operation control means for causing said character to perform a set of sequential operations in a cycle that includes an acceleration warm-up operation performed in a first period, an accelerating operation performed in a second period during which a movement of the character is accelerated, and a decelerating operations, said operation control means causing the operation of said character to return to a start point of said first period in said cycle in a case where said operation means is operated during performance of said sequential operations in said cycle by fast-forwarding remaining operations in said cycle at a time of operating the operation means.

2. A competition video game machine according to claim 1, further comprising display control means for displaying at least an end point of said second period on said display means.

3. A competition video game machine according to claim 1, wherein said operation control means causes said character to perform the decelerating operation in a third period followed by said second period, and also causes said character to repeat a cycle consisting of said first period, said second period, and said third period.

4. A competition video game machine according to claim 3, further comprising display control means for displaying at least an end point of said second period on said display means.

5. A competition video game machine according to claim 3, further comprising storage means for storing frame images representing postures of said character consisting of a predetermined number of frames that are preset in correspondence with said first period, said second period, and said third period, wherein said operation control means causes said display means to display the frame images in accordance with a lapse of each of said first period, said second period, and said third period.

6. A competition video game machine according to claim 5, further comprising display control means for displaying at least an end point of said second period on said display means.

7. A competition video game machine according to claim 5, wherein said operation control means causes the remaining frame images of said operation cycle to be fast-forwarded in a case where said operation means is operated, and said operation control means then returns the operation to said first period.

8. A competition video game machine according to claim 7, further comprising display control means for displaying at least an end point of said second period on said display means.

9. A competition video game machine according to claim 1, wherein said character comprises a first driving portion and a second driving portion for movement, said operation control means causes said first driving portion and said second driving portion alternately to perform said set of operations, and said operation means comprises a first operation unit which provides an instruction to move said first driving portion and a second operation unit which provides an instruction to move said second driving portion.

10. A competition video game machine according to claim 1, wherein said game space is a simulated skating rink, said character is a simulated skater skating on the skating rink, said character comprises a first driving portion and a second driving portion for movement, said operation control means causes said first driving portion and said second driving portion alternately to perform said set of operations, and said first driving portion and said second driving portion are the skater's feet.

11. A competition video game machine according to claim 1, wherein the operation control means changes an operation pattern of the character which affects a moving speed of the character in accordance with a number of operation times of the operation means.

12. A competition video game machine according to claim 11, wherein the operation control means changes the operation pattern when the number of operation times of the operation means exceeds a predetermined number.

13. A competition video game machine according to claim 11, wherein the operation control means changes a moving pattern of the character from a lower speed to a higher speed when the number of operation times of the operation means exceeds a predetermined number.

14. A character movement control method for use in a competition video game in which a displayed character is moved in a game space by operating operation means for providing an instruction to move said character to compete against a clock, said method comprising the steps of:

causing said character to perform a set of sequential operations in a cycle that includes an acceleration warm-up operation performed in a first period, an accelerating operation performed in a second period during which a movement of the character is accelerated, and a decelerating operation; and causing the operation of said character to return to a start point of said first period in said cycle in a case where said operation means is operated during performance of said sequential operations in said cycle by fast-forwarding remaining operations in said cycle at a time of operating the operation means.

15. A recording medium for recording a character movement control program for use in a competition video game in which a displayed character is moved in a game space by operating operation means for providing an instruction to move said character to compete against a clock, said program comprising:

an operation control step of causing said character to perform a set of sequential operations that includes an acceleration warm-up operation performed in a first period, an accelerating operation performed in a second period during which a movement of the character is accelerated, and a decelerating operation; and a starting control step of causing the operation of said character to return to a start point of said first period in said cycle in a case where said operation means is operated during performance of said sequential operations in said cycle by fast-forwarding remaining operations in said cycle at a time of operating the operation means.

16. A competition video game machine comprising:

display means for displaying a character having a left leg and a right leg which is moved in a game space to compete against a clock;

operation means for providing an instruction to move said left leg and said right leg of the character;

operation control means for causing said left leg and said right leg of the character to sequentially repeat a cycle that consists of the following sequential operations (a) through (f):

a) an acceleration warm up operation for said left leg of the character performed in a first period;

b) an accelerating operation performed for said left leg of the character in a second period; and c) a decelerating operation performed for said left leg of the character in a third period;

d) an acceleration warm up operation for said right leg of the character performed in a fourth period;

e) an accelerating operation performed for said right leg of the character in a fifth period; and f) a decelerating operation performed for said right leg of the character in a sixth period;

said operation control means causing remaining operations in said cycle at a time of operation of the operation means to be fast-forwarded and then the operation of said character to return to a start point of said first period in said cycle when the operation means is operated during the performance of said sequential operations in said cycle.

* * * * *